US011350365B2

(12) United States Patent
Nam et al.

(10) Patent No.: US 11,350,365 B2
(45) Date of Patent: May 31, 2022

(54) CONFIGURATION OF CONTROL RESOURCES FOR WAKE-UP SIGNALING

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US)

(73) Assignee: Qualcomm Incorporated

( * ) Notice: Subject to any disclaimer, the term of this patent is extended or adjusted under 35 U.S.C. 154(b) by 91 days.

(21) Appl. No.: 17/012,647

(22) Filed: Sep. 4, 2020

(65) Prior Publication Data

US 2021/0084590 A1 Mar. 18, 2021

Related U.S. Application Data

(60) Provisional application No. 62/901,048, filed on Sep. 16, 2019.

(51) Int. Cl.
*H04W 52/02* (2009.01)
*H04L 1/00* (2006.01)
*H04L 5/00* (2006.01)

(52) U.S. Cl.
CPC ....... *H04W 52/0229* (2013.01); *H04L 1/0038* (2013.01); *H04L 5/0007* (2013.01); *H04W 52/0216* (2013.01); *H04W 52/0219* (2013.01)

(58) Field of Classification Search
CPC ........... H04W 72/042; H04W 52/0209; H04W 68/02; H04W 68/005; H04W 76/28; H04W 76/11; H04W 52/0216; H04W 52/0206; H04W 24/10; H04B 7/0413; H04L 5/0032
USPC .................................................. 370/311, 252
See application file for complete search history.

(56) References Cited

U.S. PATENT DOCUMENTS

2020/0092814 A1* 3/2020 Zhou ..................... H04W 80/02
2020/0145921 A1* 5/2020 Zhang ................... H04W 76/27

* cited by examiner

*Primary Examiner* — Phuoc H Doan
(74) *Attorney, Agent, or Firm* — Holland & Hart LLP

(57) ABSTRACT

Wireless communications systems may employ shared control resource set (CORESET) configurations for control information monitoring by a user equipment (UE) in an inactive state (e.g., for wake-up signal (WUS) monitoring) and for control information monitoring by a UE in an active state (e.g., for physical downlink control channel (PDCCH) monitoring). Further, a shared CORESET configuration may support one or more dynamic or variable configuration parameters, such that a shared CORESET configuration may be partially modified to optimize control information monitoring in different scenarios (e.g., to optimize WUS monitoring and PDCCH monitoring when using a shared CORESET configuration). For example, a CORESET configuration may include one or more static configuration parameters (e.g., a time resource, a frequency resource, a transmission configuration indicator (TCI) state, etc.) and one or more dynamic configuration parameters (e.g., an interleaving pattern, a precoding granularity, a time duration, a scrambling identification, etc.).

60 Claims, 18 Drawing Sheets

CONFIGURATION OF CONTROL RESOURCES FOR WAKE-UP SIGNALING

CROSS REFERENCE

The present application for patent claims the benefit of U.S. Provisional Patent Application No. 62/901,048 by NAM et al., entitled "CONFIGURATION OF CONTROL RESOURCES FOR WAKE-UP SIGNALING," filed Sep. 16, 2019, assigned to the assignee hereof, and expressly incorporated by reference herein.

BACKGROUND

The following relates generally to wireless communications, and more specifically to configuration of control resources for wake-up signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support configuration of control resources for wake-up signaling, for example, for a control resource set. Generally, the described techniques provide for shared control resource set (CORESET) configurations for control information monitoring by a user equipment (UE) in an inactive state (e.g., for wake-up signal (WUS) monitoring) and for control information monitoring by a UE in an active state (e.g., for physical downlink control channel (PDCCH) monitoring). Further, the shared CORESET configuration may support one or more dynamic or otherwise variable configuration parameters, such that a shared CORESET configuration may be partially modified to optimize control information monitoring in different scenarios or at different times (e.g., to optimize WUS monitoring and PDCCH monitoring when using a shared CORESET configuration).

For example, a CORESET configuration may include one or more static configuration parameters (e.g., a time resource, a frequency resource, a transmission configuration indicator (TCI) state, etc.) that are the same for UE monitoring of WUSs and UE monitoring of PDCCH during UE active time, and one or more dynamic configuration parameters (e.g., an interleaving pattern, a precoding granularity, a time duration, a scrambling identification, etc.) that may be determined or modified depending on whether the UE is monitoring WUSs outside of a UE active time or whether the UE is monitoring PDCCH during UE active time. In some examples, a UE may determine values of one or more configuration parameters of a shared CORESET configuration based on whether the UE is monitoring a WUS search space set of the CORESET outside an active time or whether the UE is monitoring other non-WUS search space sets of the CORESET during an active time.

A method of wireless communication at a UE is described. The method may include identifying a control resource set configuration that includes a first value of a first parameter and values of one or more additional parameters, identifying a control resource set to monitor for a wake-up signal based on the identified control resource set configuration, determining a second value of the first parameter based on the control resource set being associated with the wake-up signal, and monitoring for the wake-up signal in the identified control resource set according to the determined second value of the first parameter and the values of the one or more additional parameters.

An apparatus for wireless communication at a UE is described. The apparatus may include a processor, memory coupled with the processor, and instructions stored in the memory. The instructions may be executable by the processor to cause the apparatus to identify a control resource set configuration that includes a first value of a first parameter and values of one or more additional parameters, identify a control resource set to monitor for a wake-up signal based on the identified control resource set configuration, determine a second value of the first parameter based on the control resource set being associated with the wake-up signal, and monitor for the wake-up signal in the identified control resource set according to the determined second value of the first parameter and the values of the one or more additional parameters.

Another apparatus for wireless communication at a UE is described. The apparatus may include means for identifying a control resource set configuration that includes a first value of a first parameter and values of one or more additional parameters, identifying a control resource set to monitor for a wake-up signal based on the identified control resource set configuration, determining a second value of the first parameter based on the control resource set being associated with the wake-up signal, and monitoring for the wake-up signal in the identified control resource set according to the determined second value of the first parameter and the values of the one or more additional parameters.

A non-transitory computer-readable medium storing code for wireless communication at a UE is described. The code may include instructions executable by a processor to identify a control resource set configuration that includes a first value of a first parameter and values of one or more additional parameters, identify a control resource set to monitor for a wake-up signal based on the identified control resource set configuration, determine a second value of the first parameter based on the control resource set being associated with the wake-up signal, and monitor for the wake-up signal in the identified control resource set according to the determined second value of the first parameter and the values of the one or more additional parameters.

In some examples of the method, apparatuses, and non-transitory computer-readable medium described herein, determining the second value of the first parameter based on the control resource set being associated with the wake-up signal may include operations, features, means, or instructions for identifying a second control resource set configuration that includes at least the second value of the first parameter, where the identified control resource set configuration may be for control resource sets during an active state of the UE, and the second control resource set configuration may be for control resource sets, including the identified control resource set, outside the active state of the UE, and determining the second value of the first parameter from the second control resource set configuration.

In some examples of the method, apparatuses, and non-transitory computer-readable medium described herein, determining the second value of the first parameter may include operations, features, means, or instructions for modifying the first value of the first parameter to be the second value based on identifying that the identified control resource set may be associated with the wake-up signal. In some examples of the method, apparatuses, and non-transitory computer-readable medium described herein, the first parameter includes an interleaving pattern, a precoding granularity, a control channel element-to-resource element group mapping, a time duration, a scrambling identification, or a combination thereof.

In some examples of the method, apparatuses, and non-transitory computer-readable medium described herein, the one or more additional parameters include a time resource, a frequency resource, a transmission configuration indicator state, or a combination thereof. In some examples of the method, apparatuses, and non-transitory computer-readable medium described herein, identifying the control resource set to monitor for the wake-up signal may include operations, features, means, or instructions for identifying a wake-up signal search space set associated with the control resource set.

Some examples of the method, apparatuses, and non-transitory computer-readable medium described herein may further include operations, features, means, or instructions for identifying that, among one or more search space sets associated with the control resource set, a search space set configuration may be associated with the wake-up signal, determining that the search space set configuration indicates the second value of the first parameter, and modifying the first value to be the second value for the monitoring for the wake-up signal based on the search space set configuration being associated with the wake-up signal.

Some examples of the method, apparatuses, and non-transitory computer-readable medium described herein may further include operations, features, means, or instructions for identifying a search space set configuration that indicates the second value of the first parameter, and determining to use the second value based on the search space set configuration not being associated with the wake-up signal. In some examples of the method, apparatuses, and non-transitory computer-readable medium described herein, identifying the control resource set to monitor for the wake-up signal may include operations, features, means, or instructions for identifying the control resource set may be configured outside of a discontinuous reception active time duration.

Some examples of the method, apparatuses, and non-transitory computer-readable medium described herein may further include operations, features, means, or instructions for determining a bandwidth associated with the control resource set may be above a threshold, where the second value of the first parameter may be determined based on the determination that the bandwidth associated with the control resource set may be above the threshold. Some examples of the method, apparatuses, and non-transitory computer-readable medium described herein may further include operations, features, means, or instructions for determining a bandwidth associated with the control resource set may be below a threshold, where the second value of the first parameter may be determined based on the determination that the bandwidth associated with the control resource set may be below the threshold.

Some examples of the method, apparatuses, and non-transitory computer-readable medium described herein may further include operations, features, means, or instructions for determining a number of UEs in a wake-up group associated with the monitoring for the wake-up signal may be above a threshold, where the second value of the first parameter may be determined based on the determination that the number of UEs in the wake-up group associated with the monitoring for the wake-up signal may be above the threshold. Some examples of the method, apparatuses, and non-transitory computer-readable medium described herein may further include operations, features, means, or instructions for determining a number of UEs in a wake-up group associated with the monitoring for the wake-up signal may be below a threshold, where the second value of the first parameter may be determined based on the determination that the number of UEs in the wake-up group associated with the monitoring for the wake-up signal may be below the threshold.

Some examples of the method, apparatuses, and non-transitory computer-readable medium described herein may further include operations, features, means, or instructions for identifying a time duration for which the determined second value of the first parameter may be valid, and switching the first parameter back to the first value after the identified time duration. Some examples of the method, apparatuses, and non-transitory computer-readable medium described herein may further include operations, features, means, or instructions for transmitting an indication of the time duration, the second value, or both, where the second value may be determined based on the transmitted indication. Some examples of the method, apparatuses, and non-transitory computer-readable medium described herein may further include operations, features, means, or instructions for receiving an indication of the time duration, the second value, or both, where the second value may be determined based on the received indication. Some examples of the method, apparatuses, and non-transitory computer-readable medium described herein may further include operations, features, means, or instructions for receiving the wake-up signal based on the monitoring, and monitoring for a scheduling transmission during an active state of the UE based on the received wake-up signal and the second value of the first parameter.

A method of wireless communication at a base station is described. The method may include identifying, for a UE, a control resource set configuration that includes a first value of a first parameter and values of one or more additional parameters, identifying a control resource set in which to transmit a wake-up signal to the UE based on the identified control resource set configuration, determining a second value of the first parameter based on the control resource set in which the wake-up signal is to be transmitted being associated with the wake-up signal, and transmitting the wake-up signal in the identified control resource set according to the determined second value of the first parameter and the values of the one or more additional parameters.

An apparatus for wireless communication at a base station is described. The apparatus may include a processor, memory coupled with the processor, and instructions stored in the memory. The instructions may be executable by the processor to cause the apparatus to identify, for a UE, a control resource set configuration that includes a first value of a first parameter and values of one or more additional parameters, identify a control resource set in which to transmit a wake-up signal to the UE based on the identified control resource set configuration, determine a second value of the first parameter based on the control resource set in which the wake-up signal is to be transmitted being associated with the wake-up signal, and transmit the wake-up signal in the identified control resource set according to the determined second value of the first parameter and the values of the one or more additional parameters.

Another apparatus for wireless communication at a base station is described. The apparatus may include means for identifying, for a UE, a control resource set configuration that includes a first value of a first parameter and values of one or more additional parameters, identifying a control resource set in which to transmit a wake-up signal to the UE based on the identified control resource set configuration, determining a second value of the first parameter based on the control resource set in which the wake-up signal is to be transmitted being associated with the wake-up signal, and transmitting the wake-up signal in the identified control resource set according to the determined second value of the first parameter and the values of the one or more additional parameters.

A non-transitory computer-readable medium storing code for wireless communication at a base station is described. The code may include instructions executable by a processor to identify, for a UE, a control resource set configuration that includes a first value of a first parameter and values of one or more additional parameters, identify a control resource set in which to transmit a wake-up signal to the UE based on the identified control resource set configuration, determine a second value of the first parameter based on the control resource set in which the wake-up signal is to be transmitted being associated with the wake-up signal, and transmit the wake-up signal in the identified control resource set according to the determined second value of the first parameter and the values of the one or more additional parameters.

In some examples of the method, apparatuses, and non-transitory computer-readable medium described herein, determining the second value of the first parameter based on the control resource set being associated with the wake-up signal may include operations, features, means, or instructions for identifying a second control resource set configuration of the UE that includes at least the second value of the first parameter, where the identified control resource set configuration may be for control resource sets during an active state of the UE, and the second control resource set configuration may be for control resource sets, including the identified control resource set, outside the active state of the UE, and determining the second value of the first parameter from the second control resource set configuration.

In some examples of the method, apparatuses, and non-transitory computer-readable medium described herein, determining the second value of the first parameter may include operations, features, means, or instructions for modifying the first value of the first parameter to be the second value based on identifying that the identified control resource set may be associated with the wake-up signal. In some examples of the method, apparatuses, and non-transitory computer-readable medium described herein, the first parameter includes an interleaving pattern, a precoding granularity, a control channel element-to-resource element group mapping, a time duration, a scrambling identification, or a combination thereof. In some examples of the method, apparatuses, and non-transitory computer-readable medium described herein, the one or more additional parameters include a time resource, a frequency resource, a transmission configuration indicator state, or a combination thereof.

In some examples of the method, apparatuses, and non-transitory computer-readable medium described herein, identifying the control resource set in which to transmit the wake-up signal may include operations, features, means, or instructions for identifying a wake-up signal search space set associated with the control resource set. Some examples of the method, apparatuses, and non-transitory computer-readable medium described herein may further include operations, features, means, or instructions for identifying that, among one or more search space sets associated with the control resource set, a search space set configuration may be associated with the wake-up signal, determining that the search space set configuration indicates the second value of the first parameter, and modifying the first value to be the second value for the monitoring for the wake-up signal based on the search space set configuration being associated with the wake-up signal.

Some examples of the method, apparatuses, and non-transitory computer-readable medium described herein may further include operations, features, means, or instructions for identifying a search space set configuration that indicates the second value of the first parameter, and determining to use the second value based on the search space set configuration not being associated with the wake-up signal. In some examples of the method, apparatuses, and non-transitory computer-readable medium described herein, identifying the control resource set in which to transmit the wake-up signal may include operations, features, means, or instructions for identifying the control resource set may be configured outside of a discontinuous reception active time duration. Some examples of the method, apparatuses, and non-transitory computer-readable medium described herein may further include operations, features, means, or instructions for determining a bandwidth associated with the control resource set may be above a threshold, where the second value of the first parameter may be determined based on the determination that the bandwidth associated with the control resource set may be above the threshold.

Some examples of the method, apparatuses, and non-transitory computer-readable medium described herein may further include operations, features, means, or instructions for determining a bandwidth associated with the control resource set may be below a threshold, where the second value of the first parameter may be determined based on the determination that the bandwidth associated with the control resource set may be below the threshold. Some examples of the method, apparatuses, and non-transitory computer-readable medium described herein may further include operations, features, means, or instructions for determining a number of UEs in a wake-up group associated with the transmitting of the wake-up signal may be above a threshold, where the second value of the first parameter may be determined based on the determination that the number of UEs in the wake-up group associated with the transmitting of the wake-up signal may be above the threshold.

Some examples of the method, apparatuses, and non-transitory computer-readable medium described herein may further include operations, features, means, or instructions for determining a number of UEs in a wake-up group associated with the transmitting of the wake-up signal may be below a threshold, where the second value of the first parameter may be determined based on the determination that the number of UEs in the wake-up group associated with the transmitting of the wake-up signal may be below the threshold. Some examples of the method, apparatuses, and non-transitory computer-readable medium described herein may further include operations, features, means, or instructions for identifying a time duration for which the determined second value of the first parameter may be valid, and switching the first parameter back to the first value after the identified time duration.

Some examples of the method, apparatuses, and non-transitory computer-readable medium described herein may further include operations, features, means, or instructions for transmitting an indication of the time duration, the second value, or both, where the second value may be determined based on the transmitted indication. Some examples of the method, apparatuses, and non-transitory computer-readable medium described herein may further include operations, features, means, or instructions for receiving an indication of the time duration, the second value, or both, where the second value may be determined based on the received indication.

DETAILED DESCRIPTION

Figure 1:
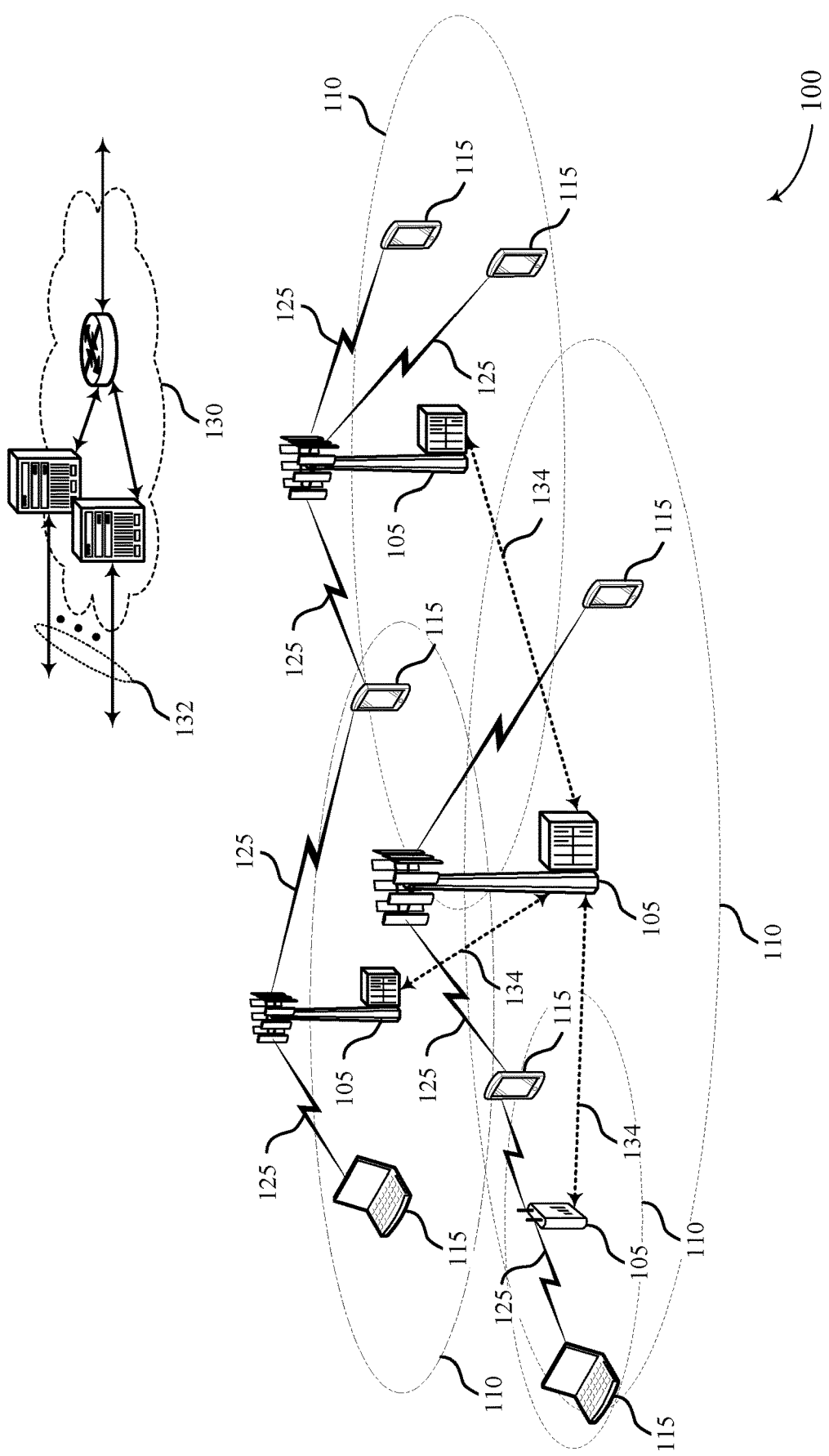
FIG. 1 illustrates an example of a system for wireless communications that supports configuration of control resources for wake-up signaling in accordance with aspects of the present disclosure.

A wireless device may implement a discontinuous reception (DRX) cycle to enable the efficient use of battery power for reception of downlink transmissions. A base station and a user equipment (UE) may establish a radio resource control (RRC) connection and the UE may enter a sleep state when not actively communicating with the base station. For example, during RRC connection establishment, a DRX configuration, including a DRX-on cycle duration and a DRX-off cycle duration, may be configured in an RRC connection setup request or an RRC connection reconfiguration request. The DRX configuration may determine how frequently the UE is scheduled to wake-up and be available for receiving downlink data in accordance with the configured DRX cycle durations. For example, a UE may operate in a connected DRX (C-DRX) mode, where the UE transitions between an active state and a sleep state. In some examples, the UE wakes up to determine if data is available for the UE in the active state, and the UE shuts down various hardware/processes to conserve power in the sleep state. In some examples, prior to transitioning to an active state during a DRX on-duration, the UE may determine if any downlink data is present for the UE by monitoring for one or more wake-up signals (WUSs) during WUS occasions (e.g., during configured WUS occasions of DRX off-durations or UE sleep states). The WUSs may carry or otherwise convey an indication that the base station has data ready to transmit to the UE during a next DRX on-duration (e.g., during a next DRX active time). In such systems, a UE may conserve power by being configured to only wake-up (transition to an active state) in an on-duration of a DRX cycle when the UE receives a WUS from the base station prior to the DRX on-duration within a WUS occasion.

For example, a wireless communications system may employ physical downlink control channel (PDCCH)-based WUSs (e.g., wake-up downlink control information (DCI) with cyclic redundancy check (CRC) scrambled by power saving radio network temporary identifier (PS-RNTI)). In cases where a UE monitors for and receives a PDCCH-based WUS during a WUS monitoring occasion, the UE may transition to an active state and monitor PDCCH during a corresponding DRX on-duration. For example, a UE may receive a WUS in a WUS occasion of a DRX off-duration, and the UE may then transition to an active state to monitor for control information, scheduling information, etc., during a next DRX on-duration (during a next configured UE active time). In cases where a UE does not receive a WUS during a WUS occasion, the UE may remain in a sleep mode over a next on-duration. For example, the UE may not receive a WUS during the WUS occasion when there is no control information for the UE during the on-duration corresponding to the WUS occasion where no WUS was received.

In some wireless communications systems, a base station may configure a search space set for transmission of such control information (e.g., for transmission of PDCCH-based WUSs, for transmission of scheduling PDCCH in on-durations, etc.) to a UE. For example, a WUS search space set (e.g., a wake-up (WU)-search space set) may include or configure a number of PDCCH blind decoding candidates for UE monitoring of a WUS. Similarly, other search space sets (e.g., non-WU-search space sets) may include or configure a number of PDCCH blind decoding candidates for UE monitoring of PDCCH in an on-duration or UE active time. A base station may configure one or more search space sets for transmission of DCI to the UE within a control resource set (CORESET). Generally, a CORESET may refer to a set of physical resources and a set of parameters (e.g., configuration parameters) that are used (e.g., that are configured) to carry PDCCH, including one or more DCIs. In some cases, the base station may configure multiple CORESETs for the UE. A UE may thus be configured to monitor different search space sets of different CORESETs for various control information.

For example, wireless communications systems may employ dedicated search space set configurations for WUSs. A UE may be configured with a WUS search space set, and may monitor a CORESET (e.g., for a WUS) outside of an active time (e.g., during a WUS occasion) according to the WUS search space set. Further, in some cases, one or more CORESETs for WUSs may be dedicatedly configurable. For example, one or more CORESETs may be separately configured for WUS monitoring outside UE active time, such as during WUS occasions. However, separate configuration of CORESETs for WUS monitoring and scheduling PDCCH monitoring (separate configuration of CORESETs for UE monitoring outside of UE active time and configuration of CORESETs for UE monitoring inside of UE active time) may increase complexity at the UE or alternatively may reduce the number of CORESETs usable by the UE during UE active time which may result in reduced scheduling flexibility. For example, the complexity of the UE may be increased through an increased number of CORESETs a UE is to be capable of supporting. In some examples, the scheduling flexibility may be reduced where the UE capability may be leveraged to use fewer CORESETs for UE active time to enable separate configuration of CORESETs for WUS monitoring outside of UE active time.

The techniques described herein may provide for improved configuration of control resources for wake-up signaling (e.g., for WUS monitoring by a UE). For example, a shared CORESET configuration (e.g., at least some configuration parameters of a CORESET) may be used for both PDCCH-based WUS monitoring outside UE active time and PDCCH monitoring during UE active time. According to the techniques described herein, when a same CORESET configuration is shared, some configuration parameters may be static and some configuration parameters may be modified or updated depending on whether the CORESET configuration is being used for WUS monitoring during WUS occasions or whether the CORESET configuration is being used for PDCCH monitoring during UE active time. For example, a CORESET configuration may include one or more static configuration parameters (CORESET configuration parameters that are the same for UE monitoring of WUSs and UE monitoring of PDCCH during UE active time) and one or more dynamic configuration parameters (CORESET configuration parameters that are determined or modified depending on whether the UE is monitoring WUSs outside of a UE active time or whether the UE is monitoring PDCCH during UE active time). As such, a UE may determine values of one or more configuration parameters of a shared CORESET configuration based on whether the UE is monitoring a WUS search space set of the CORESET outside an active time or whether the UE is monitoring other non-WUS search space sets of the CORESET during an active time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Aspects of the disclosure are initially described in the context of a wireless communications system. Example WUS configurations, an example timeline, and an example process flow illustrating aspects of the discussed techniques are then described. Aspects of the disclosure are further illustrated by and described with reference to apparatus diagrams, system diagrams, and flowcharts that relate to configuration of control resources for wake-up signaling.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, synchronization (e.g., cell acquisition) may be performed using synchronization signals or channels transmitted by a network entity (e.g., a base station 105). In some cases, a base station 105 may transmit synchronization signal (SS) blocks (which may be referred to as SS bursts) containing discovery reference signals. For example, SS blocks may include a primary synchronization signal (PSS), a secondary synchronization signal (SSS), a physical broadcast channel (PBCH), or other synchronization signals (e.g., a tertiary synchronization signal (TSS)). In some examples, the signals included in an SS block may include a PSS, an SSS, a PBCH, and/or other synchronization signals that are time division multiplexed. For example, the signals included in an SS block may include a time division multiplexed first PBCH, SSS, second PBCH, and PSS (transmitted in the indicated order), or a time division multiplexed first PBCH, SSS, PSS, and second PBCH (transmitted in the indicated order), etc. In other examples, PBCH transmissions may be transmitted in a subset of SS block time resources (e.g., in two symbols of an SS block), and synchronization signals (e.g., PSS and SSS) may be transmitted in another subset of SS block time resources. Furthermore, in deployments that use mmW transmission frequencies, multiple SS blocks may be transmitted in different directions using beam sweeping in a SS burst, and SS bursts may be periodically transmitted according to a SS burst set. In cases where a base station 105 may transmit omni-directionally, a SS block may be periodically transmitted according to a configured periodicity.

For example, a base station 105 may transmit multiple instances of an SS block, on different beams, during a periodic broadcast channel transmission time interval (BCH TTI). In other cases, a base station 105 may transmit multiple instances of a SS block on a same beam, or in an omnidirectional manner, during a periodic BCH TTI. A UE 115 attempting to access a wireless network may perform an initial cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS. The SSS may enable radio frame synchronization, and may provide a cell group identity value. The cell group identity value may be combined with the physical layer identifier to form the physical cell identifier (PCID), which identifies the cell. The SSS may also enable detection of a duplexing mode and a cyclic prefix (CP) length. An SSS may be used to acquire other system information (e.g., subframe index). The PBCH may be used to acquire additional system information needed for acquisition (e.g., bandwidth, frame index, etc.). In some cases, the PBCH may carry master information block (MIB) and one or more system information blocks (SIBS) for a given cell.

Because a base station 105 may not know the locations of devices attempting to synchronize with a cell of the base station, SS blocks may be successively transmitted in a beam swept manner (e.g., across multiple symbol periods). In some cases, a base station 105 may transmit the SS blocks using multiple transmit beams. A UE 115 may receive one or more of the SS blocks and determine a suitable downlink beam pair (e.g., based on a signal quality of the SS block being greater than a threshold). However, the beams over which the SS blocks are transmitted may be relatively coarse (e.g., broad). Accordingly, communications between the UE 115 and base station 105 may benefit from beam refinement, in which narrower uplink and downlink receive and transmit beams are selected. The width of a given beam (e.g., a narrow beam, a broad beam, etc.) may be modified by adjusting weighting of one or more of the elements in a transmitting or receiving antenna array. Such adjustments may be empirically determined by a receiving device (e.g., based on measurements of one or more reference signals). Each UE 115 attempting to access a given cell may receive a set of downlink reference signals and transmit a set of uplink reference signals to enable such beam refinement.

In some cases, a UE 115 receives an SS block may perform a cell measurement on the SS block, and may also acquire a network associated with a base station that transmitted the SS block. To determine a beam on which the SS block is transmitted, or to determine a timing of the SS block within a sequence of SS blocks (and in some cases, to fully determine the timing of the SS block or a synchronization signal therein), a UE 115 may have to decode a PBCH within the SS block and obtain an SS block index from the SS block (e.g., because the SS block index may convey a beam index associated with the SS block and/or the location of the SS block within a sequence of SS blocks).

In some examples, PDCCH may carry DCI in control channel elements (CCEs), which may consist of nine logically contiguous resource element groups (REGs), where each REG contains four resource elements (REs). DCI may include information regarding downlink scheduling assignments, uplink resource grants, transmission scheme, uplink power control, HARQ information, modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format may depend on the amount of information as well as factors such as bandwidth, the number of antenna ports, and duplexing mode.

PDCCH may carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the user equipment, a limited set of CCE locations may be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space may be partitioned into two regions: a common CCE region or search space and a UE-specific (dedicated) CCE region or search space. The common CCE region may be monitored by all UEs 115 served by a base station 105 and may include information such as paging information, system information, random access procedures and the like. The UE-specific search space may include user-specific control information. CCEs may be indexed, and the common search space may start from, for example, CCE 0. The starting index for a UE-specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

In some cases, a base station 105 may transmit a WUS to a UE 115 to transition the UE 115 into an active state during a DRX on-duration (e.g., to wake a UE 115 to receive downlink control data during a DRX on-duration). Parameters of the WUS may include a digital sequence or code to distinguish the WUS from ambient radio transmissions or other interference. In some cases, the WUS may include one or more pseudo-omni beams for transmission, and additionally or alternatively, may consist of a number of beams equivalent to the beam cardinality for SS burst transmission. Additionally, in some cases, the WUS may include instructions for initiating a wake-up procedure, without additional resource allocation or grant payloads. In some cases, the WUS may consist of a narrowband tone. The UE 115 may determine the presence or absence of the narrowband tone through an energy detection via an energy detector. In other cases, the WUS may consist of a UE specific reference signal directed to the UE 115. The UE 115 may descramble the tones of the reference signal transmission according to a correlator. In other cases, the WUS may consist of a narrowband PDCCH signal conveyed through a specific search space indicated to the UE 115. The one or more WUS implementations may conserve decoding resources at the UE 115 and therefore reduce power consumption.

In some cases, a UE 115 may monitor a communication link 125 continuously for an indication that the UE 115 may receive data. In other cases (e.g., to conserve power and extend battery life) a UE 115 may be configured for DRX operation with a DRX cycle. DRX operation may refer to, for example, UE 115 operation in a DRX mode involving both DRX on-durations and DRX off-durations. A DRX cycle consists of an "on-duration" (or active time) when the UE 115 may monitor for control information (e.g., on PDCCH) in an active state and a "DRX-period" or "off-duration" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH (which may be referred to as scheduling PDCCH) during the on-duration. While monitoring PDCCH for a scheduling message, the UE 115 may initiate a DRX Inactivity Timer. If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a DRX Short Cycle Timer. When the DRX Short Cycle Timer expires, the UE 115 may resume a long DRX cycle.

Wireless communications system 100 may support techniques described herein for improved configuration of control resources for wake-up signaling (e.g., for WUS monitoring by a UE 115). For example, wireless communications system 100 may support shared CORESET configurations employed for both PDCCH-based WUS monitoring outside UE active time and PDCCH monitoring during UE active time. According to the techniques described herein, when a same CORESET configuration is shared, some configuration parameters may be static and some configuration parameters may be determined, modified, and/or updated depending on whether the CORESET configuration is being used for WUS monitoring during WUS occasions or whether the CORESET configuration is being used for PDCCH monitoring during UE active time. For example, a CORESET configuration may include one or more static configuration parameters (e.g., CORESET configuration parameters that are the same for UE monitoring of WUSs and UE monitoring of PDCCH during UE active time) and one or more dynamic configuration parameters (e.g., CORESET configuration parameters that are determined or modified depending on whether the UE 115 is monitoring WUSs outside of a UE active time (e.g., during a DRX off-duration) or whether the UE 115 is monitoring PDCCH during UE active time (e.g., during a DRX on-duration)). A UE 115 may determine values of one or more configuration parameters of a shared CORESET configuration based on whether the UE 115 is monitoring a WUS search space set of the CORESET outside an active time or whether the UE 115 is monitoring other non-WUS search space sets of the CORESET during an active time.

Figure 2:
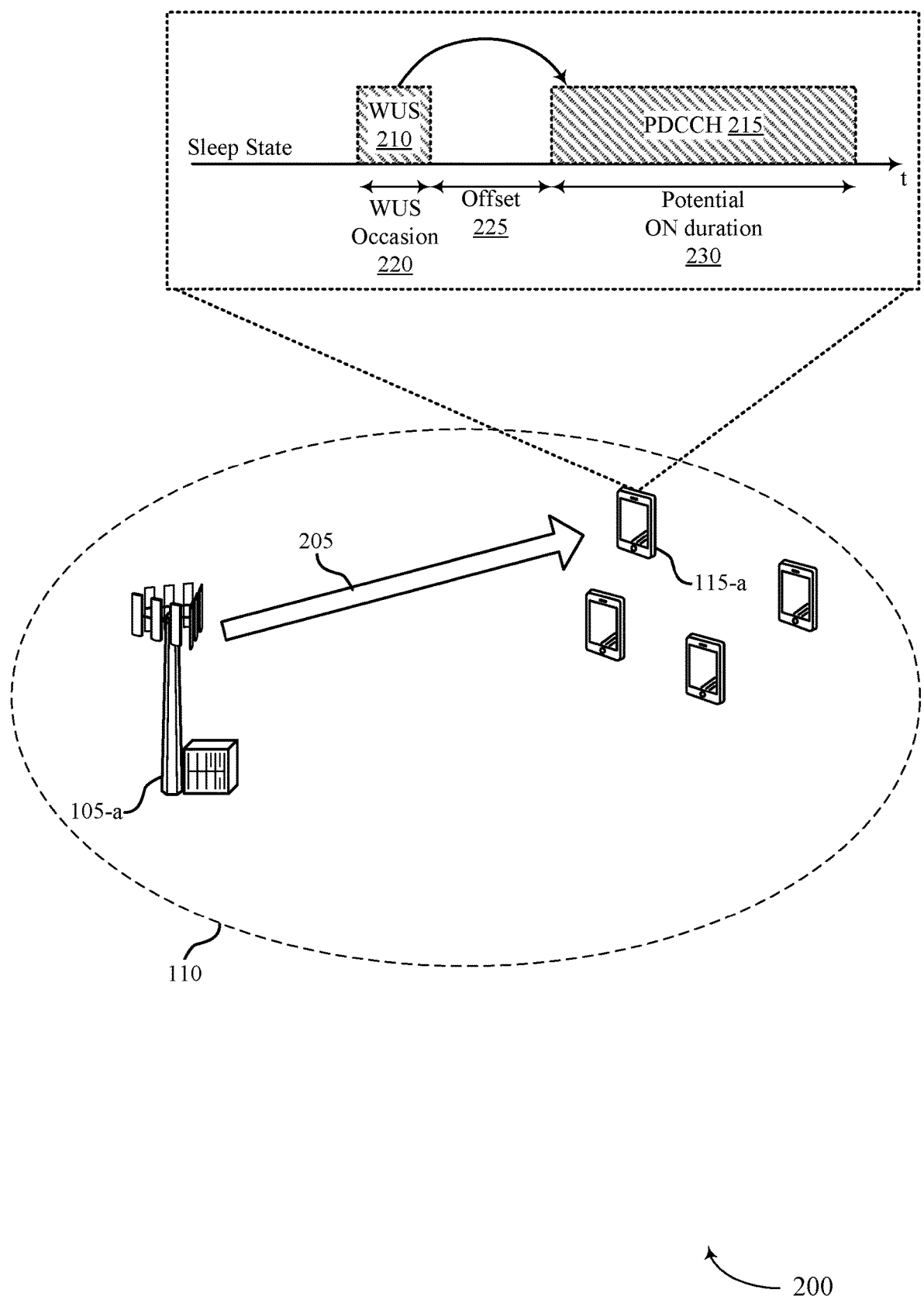
FIG. 2 illustrates an example of a wireless communications system that supports configuration of control resources for wake-up signaling in accordance with aspects of the present disclosure.

FIG. 2 illustrates an example of a wireless communications system 200 that supports configuration of control resources for wake-up signaling in accordance with aspects of the present disclosure. In some examples, wireless communications system 200 may implement aspects of wireless communications system 100. For example, wireless communications system 200 includes base station 105-a and UE 115-a. Base station 105-a may be an example of a base station 105 described with reference to FIG. 1, and may perform configuration of control resources for wake-up signaling in accordance with techniques described herein. UE 115-a may be an example of a UE 115 described with reference to FIG. 1. UE 115-a may monitor for WUSs 210 during WUS occasions 220 and monitor for PDCCH 215 (e.g., uplink/downlink scheduling PDCCH) during on-durations 230 (e.g., during UE active times) in accordance with the techniques described herein.

In wireless communications system 200, UE 115-a may support operation in a DRX mode or C-DRX mode where the UE 115-a may transition to a sleep state (e.g., a sleep mode, a DRX off state, a DRX off-duration, etc.) and wake-up periodically to monitor for data or control information from base station 105-a in accordance with a DRX cycle. As such, UE 115-a may save power since UE 115-a may not have to constantly stay awake or constantly monitor for data or control information from base station 105-a. In some cases, to further limit power consumption, UE 115-a may be configured to only wake-up in an on-duration 230 (active time) of the DRX cycle if UE 115-a receives a wake-up indication from base station 105-a prior to the on-duration 230 (e.g., if UE 115-a receives a wake-up indication in a wake-up message, which may be transmitted from base station 105-a in one or more WUSs 210 via downlink 205). That is, UE 115-a may determine if data is available (e.g., if PDCCH 215 is available during a next DRX on-duration 230) by monitoring for one or more WUSs 210 during WUS occasions 220 (e.g., during configured WUS occasions 220 of DRX off-durations or UE 115-a sleep states). The WUSs 210 may carry or otherwise convey a wake-up message that may include or refer to an indication that base station 105-a has data ready to transmit to UE 115-a during a next DRX on-duration 230. The WUS occasions 220 may occur prior to the DRX on-duration 230 by some offset 225. In some cases, WUS occasion 220 may occur during a DRX on-duration 230.

That is, for improved power efficiency during DRX (e.g., C-DRX) operation, WUSs 210 may be employed by wireless communications system 200 to reduce the chance of unnecessary wake-up in on-durations 230 by a UE 115 during DRX operation. UEs 115 may be configured to monitor WUSs 210 during WUS occasions 220. PDCCH 215 may be monitored during on-duration 230 when a corresponding WUS 210 is detected and/or when the WUS 210 indicates the UE 115 to wake-up. Otherwise (e.g., when a corresponding WUS 210 is not detected), the on-duration 230 may be skipped and the UE 115 may remain in a sleep state for power saving, and the UE 115 may not transition to an active state in the on-duration 230.

In some cases, wireless communications system 200 may employ PDCCH-based WUSs 210, and PDCCH-based WUSs 210 may be transmitted before an on-duration 230 by an offset 225. As discussed herein, dedicated search space sets (which may be referred to as WUS search space sets or WU search space sets) may be configured, which may define WUS monitoring occasions (WUS occasions 220). PDCCH-based WUSs 210 may, in some cases, refer to wake-up DCI with CRC scrambled by power saving radio network temporary identify (PS-RNTI). In some examples, multiple UEs 115 (e.g., multiple UEs 115 in a wake-up group) may share the same PDCCH-based WUS 210 with per-UE wake-up indicator fields as described in more detail herein, for example, with reference to FIG. 3. For example, if at least one UE 115 (such as UE 115-a) associated with PDCCH-based WUS 210 has downlink data in the buffer at base station 105-a (such that the UE 115-a is to be served in the next on-duration 230), base station 105-a may transmit a WUS 210 with a wake-up indication field set to 1 for the corresponding UE (e.g., for the UE 115-a). Fields for wake-up information may generally indicate PDCCH 215 monitoring behavior during a next on-duration 230 and may include, for example, aperiodic channel state information reference signal (A-CSI-RS) triggering, indication of PDCCH monitoring reduction, bandwidth part (BWP) switching and/or secondary cell (SCell)-group wake-up.

As discussed herein, resources for control channel monitoring (e.g., in NR systems, such as wireless communications system 200) may be configured by one or more CORESETs and search space set configurations. A CORESET may define time-frequency resources upon which PDCCH is transmitted, and a search space set may define one or more time occasions for blind decoding (e.g., periodicity, offset, duration, etc.) as well as candidates of PDCCHs for blind decoding. A search space set may be associated (e.g., by configuration) with a CORESET. In some examples, there may be more than one search space set associated with a single CORESET.

Although wireless communications systems may employ dedicated a search space set configuration for WUS, wireless communications systems may or may not employ a configuration of dedicated CORESETs for WUS. In other words, wireless communications system 200 may employ separate CORESETs dedicated for WUSs 210, or wireless communications system 200 may employ a shared CORESET for WUSs 210 (e.g., for WUSs 210 outside of UE 115-*a* active time and for PDCCH 215 in on-durations where UE 115-*a* is in an active state). In some cases, separate (dedicated) CORESET configuration for WUSs 210 may provide for configuration of power-efficient WUS 210 monitoring (e.g., via utilization of narrow CORESET bandwidth, via demodulation reference signal (DMRS) mapping to facilitate DMRS sequence detection, etc.). In some cases, separate (dedicated) CORESET configuration for WUSs 210 may provide for WUS-detection performance improvement (via interleaved CCE-to-REG mapping for frequency diversity, via multiple CORESETs with different TCI states or beams for beam-swept WUS 210 transmission, etc.). However, separate (dedicated) CORESET configuration for WUSs 210 may increase complexity at the UE 115-*a* or may reduce the number of CORESETs usable by UE 115-*a* during UE active time. For example, separate CORESET configuration may increase the number of CORESETs that UE 115-*a* is to be capable of supporting, and UE 115-*a* capability may be leveraged to use fewer CORESETs for UE active time to enable separate configuration of CORESETs for WUS monitoring outside of UE active time.

Alternatively, if CORSETs (CORESET configurations) are shared (such that a same CORESET can be used for WUS 210 monitoring and during active time for PDCCH 215 monitoring), optimal configurations (optimal CORESET configuration) for WUS 210 may not be optimal during active time for PDCCH 215 or vice versa. For example, WUS configuration may be group-specific, while PDCCH monitoring configuration during an active time (e.g., during on-duration 230) may be UE-specific. Due to active link management during active time (e.g., link measurement and reporting), some CORESET configuration beneficial for WUS may be overly conservative for PDCCH monitoring during active time.

As such, the techniques described herein may provide for shared CORESETs (e.g., CORESET configurations used for both WUSs 210 and PDCCH 215) where some configuration parameters of the shared CORESET may be differently applied and/or interpreted or overridden depending on whether the shared CORESET is used for WUS 210 monitoring outside UE active time or whether the shared CORESET is used for PDCCH 215 monitoring during active time. That is, wireless communications system 200 may employ the techniques described herein to share CORESET configurations for when UE 115-*a* monitors for WUSs 210 in a sleep state and for when UE 115-*a* monitors for PDCCH 215 in an active state. One or more configuration parameters of the shared CORESET configuration may be determined based on whether the shared CORESET is used for a WUS 210 (e.g., for WUS 210 monitoring outside of an active state) or whether the shared CORESET is used for a PDCCH 215 (e.g., for PDCCH 215 monitoring in an active state). As such, CORESET configurations may be shared to maintain similar complexity at the UE 115-*a* and to maintain the number of CORESETs usable by UE 115-*a* during UE active time. Further, using the described techniques, the shared CORESET configuration (e.g., some configuration parameters of the shared CORESET configuration) may be adjusted, modified, overridden, etc. based on whether or not the UE 115-*a* is monitoring for a WUS 210, such that improved CORESET configuration may be realized for WUS 210 monitoring and/or PDCCH 215 monitoring without dedicatedly configuring separate CORESETs for WUS 210 monitoring and PDCCH 215 monitoring.

In other words, the described techniques may provide for shared CORESETs with configuration changes with use case-specific determination of some configuration parameters of the CORESET configuration. A same CORESET configuration may be used for both PDCCH-based WUS 210 transmission (e.g., monitored by UE 115-*a* outside UE 115-*a* active time) and for PDCCH 215 (e.g., downlink/uplink data scheduling) transmission (e.g., monitored by UE 115-*a* during UE 115-*a* active time). When the CORESET is used for WUS 210, some configuration parameters associated with the CORESET may be modified. For example, a CORESET configuration may include or refer to a set of configuration parameters. Some configuration parameters of the shared CORESET (e.g., a time resource, a frequency resource, a TCI state, etc.) may be used for both PDCCH-based WUS 210 and for PDCCH 215, while other configuration parameters of the shared CORESET (e.g., an interleaving pattern, a precoding granularity, a CCE-to-REG mapping, a time duration, a scrambling identification, etc.) may be determined based on whether the CORESET is for PDCCH-based WUS 210 and for PDCCH 215.

For example, a CORESET may be identified as being used for WUS when the PDCCH monitoring occasion (e.g., WUS occasion 220) is determined by a WU-search space set associated with the CORESET. When base station 105-*a* configures a WU-search space set associated with a shared CORESET, base station 105-*a* and UE 115-*a* may determine values of some configuration parameters (e.g., such as an interleaving pattern, a precoding granularity, a CCE-to-REG mapping, a time duration, a scrambling identification, etc.) during the WUS occasion 220 based on the configuration of the WU-search space set (to improve or optimize the CORESET configuration for WUS 210). When base station 105-*a* configures a search space set (e.g., for PDCCH 215) associated with a shared CORESET, base station 105-*a* and UE 115-*a* may determine different values of some configuration parameters (e.g., such as a different interleaving pattern, a different precoding granularity, a different CCE-to-REG mapping, a different time duration, a different scrambling identification, etc.) during the UE active state (e.g., during on-duration 230) based on the configuration of the search space set. The base station 105-*a* may determine the different values to improve or optimize the CORESET configuration for PDCCH 215.

Some configuration parameters (e.g., such as an interleaving pattern, a precoding granularity, a CCE-to-REG mapping, a time duration, a scrambling identification, etc.) of a shared CORESET may be determined when the CORESET is used for WUS when the PDCCH monitoring occasion is determined by a WU-search space set associated with the CORESET. Some configuration parameters (e.g., such as an interleaving pattern, a precoding granularity, a CCE-to-REG mapping, a time duration, a scrambling identification, etc.) of a shared CORESET may be determined when the CORESET is used for WUS when the UE 115 is outside the DRX active time (e.g., when none of the UE's DRX timers defining active time is running).

For example, for some configuration parameters associated with a shared CORESET (e.g., for WUS 210 and/or PDCCH 215-specific configuration parameters such as an interleaving pattern, a precoding granularity, a CCE-to-REG mapping, a time duration, a scrambling identification, etc.) two sets of configuration parameters may be supported. A first set of configuration parameters may be applied when the UE 115-*a* is within the active time (e.g., when the shared CORESET is used for PDCCH 215), and a second set of configuration parameters may be applied when the UE 115-*a* is outside the active time (e.g., when the shared CORESET is used for WUS 210). For example, some configuration parameters (e.g., a time resource, a frequency resource, a TCI state, etc.) of a shared CORESET may be used regardless of whether the shared CORESET is used for WUS 210 or PDCCH 215, while other configuration parameters (e.g., an interleaving pattern, a precoding granularity, a CCE-to-REG mapping, a time duration, a scrambling identification, etc.) may be associated with two sets of values, where the set of values used for the other configuration parameters may depend on whether the shared CORESET is used for WUS 210 or PDCCH 215.

In some examples, when a shared CORESET is used for WUS, the values of some configuration parameters (e.g., of an interleaving pattern, a precoding granularity, a CCE-to-REG mapping, a time duration, a scrambling identification, etc.) may be replaced by other values that may be configured or pre-specified by the wireless communications system 200. Shared CORESETs may have some default configuration that include default values for configuration parameters for PDCCH 215, and upon detection the shared CORESET is to be used outside UE active time (e.g., upon detection the shared CORESET is used for WUS), some configuration parameters of the shared CORESET may be replaced or overridden by values that may be preconfigured by the wireless communications system 200.

In some examples, dedicated WU-search space set configurations may include some CORESET configuration parameters that may override (over-write) the corresponding configuration parameters of the shared CORESET. For example, in some cases, a shared CORESET may be configured according to some set of configuration parameters, and when dedicated WU-search space sets are configured, the configured WU-search space set may include values of some configuration parameters (e.g., of an interleaving pattern, a precoding granularity, a CCE-to-REG mapping, a time duration, a scrambling identification, etc.) that may over-write values of the corresponding configuration parameters of the shared CORESET.

In some cases, any modification to a shared CORESET may be conditionally employed. In some cases, criteria may be met prior to updating or changing any configuration parameters of a shared CORESET for WUS monitoring. For example, in some cases, CORESET parameter modification rules may be defined or configured as a function of other parameters. For example, in some cases, configuration parameter modification may be applied when the associated CORESET bandwidth is smaller than some threshold, configuration parameter modification may be applied when the associated CORESET bandwidth is larger than some threshold, etc. Additionally or alternatively, in some cases, configuration parameter modification may be applied when the number of UEs 115 in a wake-up group corresponding to the WUS is smaller than some threshold, configuration parameter modification may be applied when the number of UEs 115 in a wake-up group corresponding to the WUS is greater than some threshold, etc. In some examples, configuration parameter modification may be triggered by indication from base station 105-*a* or by UE 115-*a*'s request, and the configuration parameter modification may be applied for some fixed duration of time, or until another indication or request is made. In some cases the configuration parameter modification may be applied for a configurable duration of time.

Figure 3A:
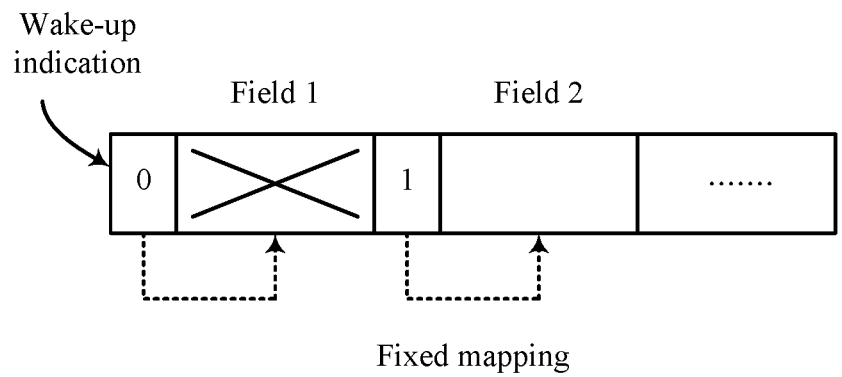
FIGS. 3A and 3B illustrate examples of wake-up signal (WUS) configurations that supports configuration of control resources for wake-up signaling in accordance with aspects of the present disclosure.
Figure 3B:
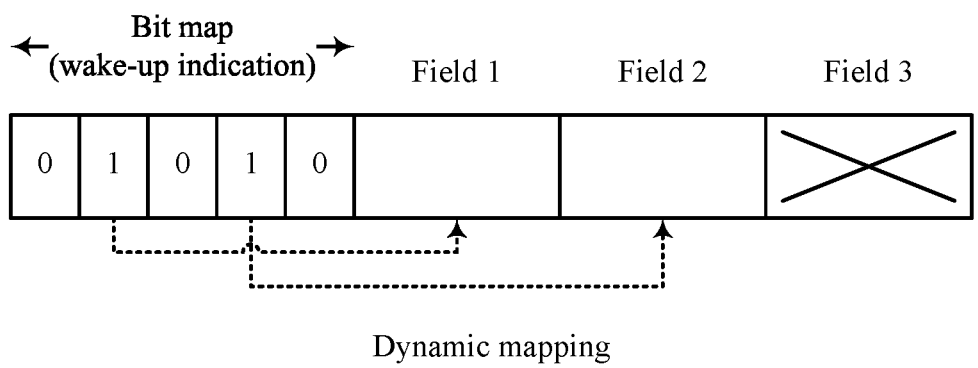

FIGS. 3A and 3B illustrate example WUS configuration 300 and example WUS configuration 301, respectively, that each support configuration of control resources for wake-up signaling in accordance with aspects of the present disclosure. In some examples, wireless communications system 100 and/or wireless communications system 200 may implement aspects of WUS configuration 300 and WUS configuration 301. For example a wake-up message may be configured according to WUS configuration 300 or WUS configuration 301, and the wake-up message may be transmitted in a WUS by a base station 105 to a UE 115.

As discussed herein, wireless communications systems may employ WUSs for improved power efficiency during C-DRX operation. Such WUSs may reduce occurrence of unnecessary wake-up during DRX operation (e.g., reduce occurrence of UE wake-up when no data is pending at the base station during a DRX on-duration). For example, using WUS techniques, a UE may monitor PDCCH during a DRX on-duration when a corresponding WUS is detected, otherwise, the DRX on-duration may be skipped and the UE may remain in a sleep state for power savings. As discussed herein (e.g., with reference to FIG. 2), PDCCH-based WUSs may be transmitted during a WUS occasion configured prior to an on-duration by some offset.

PDCCH-based WUSs may be configured for a single UE or for a group of UEs. For each UE or each sub-group of UEs sharing a same PDCCH-based WUS, a wake-up indication field in DCI may be assigned to indicate whether the corresponding UE or sub-group of UEs is to wake-up to receive PDCCH data during an on-duration associated with the PDCCH-based WUS. If the wake-up indication is set (e.g., the wake-up indication field is set to "1"), the UE, or sub-group of UEs, associated with the wake-up indication may wake-up for the next DRX on-duration. Otherwise (if the wake-up indication is set to "0"), the UE, or sub-group of UEs, associated with the wake-up indication may skip the next DRX on-duration and remain in a sleep state or low power state to conserve power. For example, if at least one UE associated with PDCCH-based WUS has downlink data in the buffer (e.g., to be served in the next on-duration), a base station may transmit a WUS with a wake-up indication field set to 1 for the corresponding UE.

WUS configuration 300 may illustrate a fixed mapping between wake-up indications and corresponding fields (information fields) of a WUS. For example, in WUS configuration 300, a wake-up indication may be followed by a field including wake-up information such as a BWP, a number of carriers to be activated for the next on-duration, uplink resources for corresponding beam feedback, etc. For example, in cases where uplink resources for WUS-based beam feedback reporting are dynamically configured, the field associated with a wake-up indication may include information indicating such a corresponding uplink resource configuration. WUS configuration 301 may illustrate a dynamic mapping between wake-up indications and corresponding fields (information fields) of a WUS. For example, WUS configuration 301 may include a bitmap of wake-up indications, and for each wake-up indication set to "1," a respective corresponding field may follow the bitmap. In some examples, fields corresponding to a wake-up indication (e.g., 'Field 2' in example WUS configuration 300, 'Field 1' and 'Field 2' in example WUS configuration 301) may include information or sub-fields indicating A-CSI-RS triggering, indicating PDCCH monitoring reduction, indicating BWP switching and/or SCell-group wake-up, etc.

Figure 4:
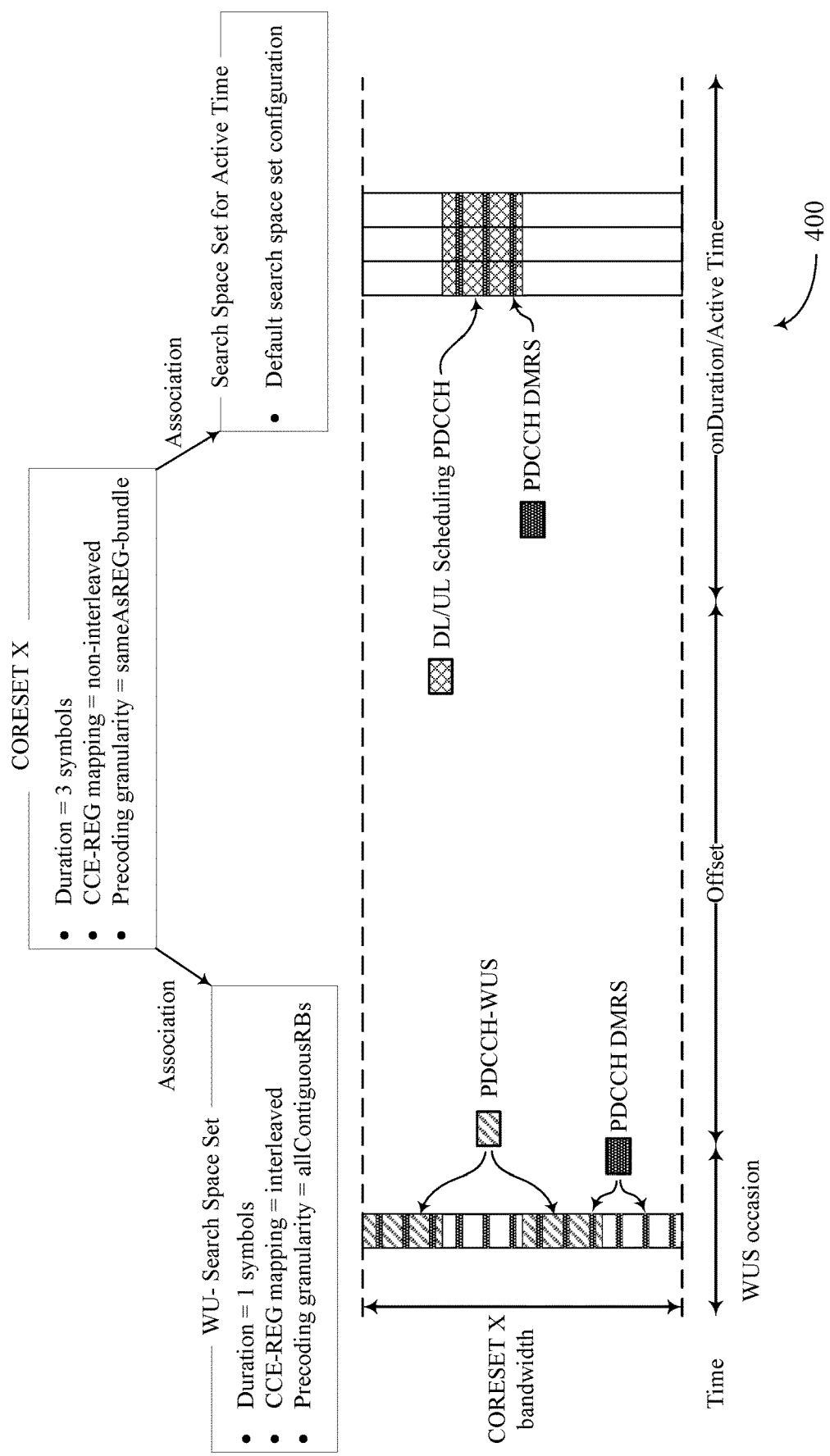
FIG. 4 illustrates an example of a control resource set (CORESET) modification diagram that supports configuration of control resources for wake-up signaling in accordance with aspects of the present disclosure.

FIG. 4 illustrates an example of a CORESET modification diagram 400 that supports configuration of control resources for wake-up signaling in accordance with aspects of the present disclosure. In some examples, wireless communications system 100 and/or wireless communications system 200 may implement aspects of CORESET modification diagram 400. For example, the CORESET modification diagram 400 may illustrate an example where search space sets may include overriding parameters for CORESET configuration (e.g., where search space sets may include values to override one or more dynamic parameters of a shared CORESET configuration).

As discussed herein a CORESET (e.g., 'CORESET X') may be shared (e.g., used, configured, etc.) for both UE inactive transmissions (e.g., WUSs outside UE active time) and UE active time transmissions (e.g., PDCCH during UE active time). For example, as illustrated by FIG. 4, a CORESET X may be configured for a WUS transmission inside a WUS occasion (e.g., a WUS transmission outside UE active time) as well as for a PDCCH transmission inside an on-duration (e.g., a PDCCH transmission during UE active time).

According to the techniques described herein, one or more configuration parameters of the CORESET X configuration (e.g., one or more dynamic configuration parameters, such as an interleaving pattern, a precoding granularity, a CCE-to-REG mapping, a time duration, a scrambling identification, etc.) may be modified or determined based on whether the CORESET X is used for WUS or for PDCCH. Further, some configuration parameters of the CORESET X configuration (e.g., one or more static configuration parameters, such as a time resource, a frequency resource, a transmission configuration indicator state, etc.) may be maintained or used regardless of whether the CORESET X is used for WUS or for PDCCH.

For instance, in the example of FIG. 4, some configuration parameters (e.g., a duration, a CCE-to-REG mapping, and a precoding granularity) may be included in, or indicated by, a configured search space set. For example, CORESET X may be associated with a configuration including configuration parameters of duration=3 symbols, CCE-REG mapping=non-interleaved, and precoding granularity=sameAsREG-bundle. A WU-search space set may be associated with the CORESET X and the WU-search space set may include or indicate different values for such configuration parameters (e.g., the WU-search space set may include or indicate configuration parameters of duration=1 symbols, CCE-REG mapping=interleaved, and precoding granularity=allContiguousRBs). As such, when the WU-search space set is configured (e.g., for a WUS transmitted by a base station during WUS occasion), the duration, CCE-REG mapping, and precoding granularity configuration parameters of the CORESET X configuration may be overridden to (e.g., modified to equal, determined as, etc.) the values indicated by the WU-search space set. As another example, WU-search space set may override a scrambling ID configuration parameter of the CORESET X (e.g., a WU-search space set may set a PDCCH-DMRS scrambling ID=function of PS-RNTI).

The CORESET X may be associated with one or more configuration parameters. Some of the configuration parameters may be static, and others may be dynamic or may be overridden by values indicated by a search space set. In the example of FIG. 4, for search space sets for active time (e.g., for search space sets configured during UE active time, such as for PDCCH during an on-duration) some default values of the CORESET X configuration parameters may be used. When a WU-search space set is configured, or when a search space set is configured outside of UE active time, the search space set may include or indicate one or more values that may override some of the configuration parameters of CORESET X. As such, a CORESET X may be configured for both WUS and PDCCH (e.g., for control information outside UE active time and for control information in UE active time), and some configuration parameters of CORESET X may be dynamically configurable based on search space set configuration. In some cases, the search space set may explicitly indicate values for one or more configuration parameter modifications. In other cases, a search space set may be preconfigured by a wireless communications system to implicitly modify or override some configuration parameters of a shared CORESET X to some values predetermined or pre-specified by the wireless communications system for the specific search space set that is configured.

Figure 5:
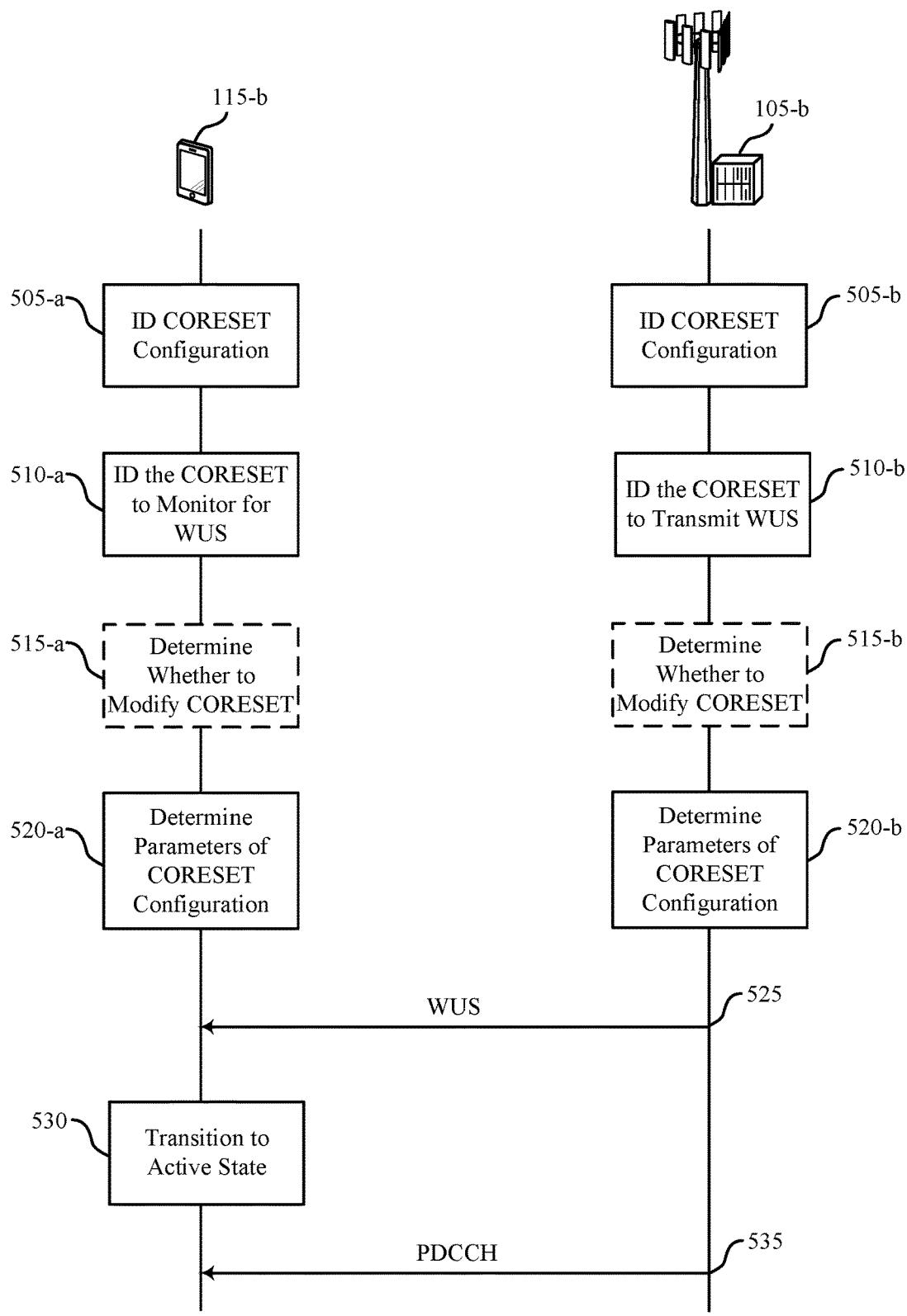
FIG. 5 illustrates an example of a process flow that supports configuration of control resources for wake-up signaling in accordance with aspects of the present disclosure.

FIG. 5 illustrates an example of a process flow 500 that supports configuration of control resources for wake-up signaling in accordance with aspects of the present disclosure. In some examples, process flow 500 may implement aspects of wireless communications system 100 and/or wireless communications system 200. Process flow 500 may be implemented by a UE 115-b and a base station 105-b, which may be examples of a UE 115 and a base station 105 described with reference to FIGS. 1-4. In the following description of the process flow 500, the operations between UE 115-b and base station 105-b may be transmitted in a different order than the order shown, or the operations performed by base station 105-b and UE 115-b may be performed in different orders or at different times. For example, 505-a, 510-a, 515-a, and 520-a may be performed in parallel, partially in parallel, in an interleaved fashion, in a partially interleaved fashion, or at different times than 505-b, 510-b, 515-b, and 520-b. Certain operations may also be left out of the process flow 500, or other operations may be added to the process flow 500. It is to be understood that while base station 105-b and UE 115-b are shown performing a number of the operations of process flow 500, any wireless device may perform the operations shown.

At 505-a and 505-b, UE 115-b and base station 105-b may respectively identify a CORESET configuration that includes a first value of a first parameter (e.g., a first value of a first configuration parameter of the CORESET configuration) and values of one or more additional parameters. In some examples, as discussed in more detail herein, the first parameter may be referred to as a dynamic configuration parameter or a configuration parameter with a value that is determined based on whether the CORESET is used for WUS or for PDCCH. In other words, the first parameter of the CORESET configuration (e.g., of the shared CORESET configuration) may be determined by UE 115-b and/or base station 105-b based on whether the CORESET is used or configuration for UE 115-b monitoring outside UE active time for WUS or whether the CORESET is used or configuration for UE 115-b monitoring inside UE active time for PDCCH. Further, the one or more additional parameters may be referred to as static configuration parameters or configuration parameters with values that used regardless of whether the CORESET is used for WUS or for PDCCH. For example, the first parameter may include an interleaving pattern, a precoding granularity, a CCE-to-REG mapping, a time duration, a scrambling identification, etc. In some cases, the CORESET configuration may include several dynamic parameters For example, the first parameter may refer to one or more of an interleaving pattern, a precoding granularity, a CCE-to-REG mapping, a time duration, a scrambling identification, etc. The one or more additional parameters may include a time resource, a frequency resource, a TCI state, or a combination thereof.

At 510-*a* and 510-*b*, UE 115-*b* and base station 105-*b* may respectively identify a CORESET to monitor for a WUS based on the identified CORESET configuration. For example, in some cases, at 510-*b*, base station 105-*b* may identify and configure UE 115-*b* with a WUS search space set associated with the CORESET. At 510-*a*, UE 115-*b* may identify a WUS search space set associated with the CORE-SET. UE 115-*b* may thus identify the CORESET to monitor for the WUS based on the configured WUS search space set being associated with the CORESET. As discussed herein, in some cases, a CORESET may be associated with one or more search space sets. As such, in some cases, the CORE-SET configuration for the UE 115-*b* to monitor for WUS (or for the base station 105-*b* to transmit WUS) may be identified based on the WUS search space set being one of the one or more search space sets associated with the CORE-SET. Additionally or alternatively, as discussed herein, the CORESET configuration for the UE 115-*b* to monitor for WUS (or for the base station 105-*b* to transmit WUS) may be identified based on whether the CORESET is configured outside of a DRX active time duration.

At 515-*a* and 515-*b*, UE 115-*b* and base station 105-*b* may respectively determine whether to modify the CORESET (e.g., whether to modify some configuration parameters, such as the first configuration parameters of the CORESET configuration). For example, any modification to a shared CORESET (e.g., any further determination or modification of any values of one or more configuration parameters) may be conditionally employed. That is, in some cases, criteria may be met prior to updating or changing any configuration parameters of a shared CORESET for WUS monitoring. For example, in some cases, CORESET parameter modification rules may be defined or configured as a function of other parameters. In some examples, UE 115-*b* and/or base station 105-*b* may determine a bandwidth associated with the CORESET is above a threshold, and may proceed to 520 based on the bandwidth associated with the CORESET being greater than the threshold. In some examples, UE 115-*b* and/or base station 105-*b* may determine a bandwidth associated with the CORESET is below a threshold, and may proceed to 520 based on the bandwidth associated with the CORESET being less than the threshold. In some examples, UE 115-*b* and/or base station 105-*b* may determine a number of UEs in a wake-up group associated with the monitoring for the WUS is above a threshold, and may proceed to 520 based on the number of UEs in a wake-up group associated with the monitoring for the WUS being greater than the threshold. In some examples, UE 115-*b* and/or base station 105-*b* may determine a number of UEs in a wake-up group associated with the monitoring for the WUS is below a threshold, and may proceed to 520 based on a number of UEs in a wake-up group associated with the monitoring for the WUS being less than the threshold.

In some examples, UE 115-*b* and/or base station 105-*b* may convey an indication of a time duration, of a second value for the first parameter, or both. In such examples, in some cases, UE 115-*b* and base station 105-*b* may determine whether to modify the CORESET (e.g., whether to modify some configuration parameters, such as the first configuration parameters of the CORESET configuration) based on such an indication. For example, UE 115-*b* and/or base station 105-*b* may identify a time duration for which any modifications may be performed, a time duration for which any second values (e.g., any determined, updated, modified, etc. values of the first configuration parameter) are valid, etc. (e.g., based on dynamic control of CORESET configuration parameter modification via indications that may be sent by UE 115-*b* and/or base station 105-*b*).

At 520-*a* and 520-*b*, UE 115-*b* and base station 105-*b* may respectively determine a second value of the first parameter based on the CORESET being associated with the WUS. In some cases, the UE 115-*b* and base station 105-*b* may respectively determine the second value based on the determination at 515 that criteria for configuration parameter modification has been satisfied.

For example, as discussed herein, in some cases a CORESET configuration (e.g., a shared CORESET configuration) may be further associated with two sets of configuration values for dynamic configuration parameters (e.g., for the first parameter) while one or more additional parameters of the CORESET configuration may be static or may be associated with a single set of configuration values. In such examples, UE 115-*b* and/or base station 105-*b* may identify a second CORESET configuration that includes at least the second value of the first parameter, where the identified CORESET configuration is for CORESETs during an active state of the UE, and the second CORESET configuration is for CORESETs, including the identified CORESET, outside the active state of the UE. UE 115-*b* and/or base station 105-*b* may then determine the second value of the first parameter from the second CORESET configuration.

As another example, as discussed herein, in some cases the dynamic configuration parameters (e.g., the first parameter) of a CORESET configuration may be replaced by other values preconfigured or pre-specified by a wireless communications system. In such cases, upon determining that the CORESET is used to monitor for (or is used to transmit) WUS, the first value of the first parameter may be modified to be the second value (which may be preconfigured or pre-specified by the wireless communications system).

As yet another example, as discussed herein, in some cases the second value (e.g., the determined value, the updated value, the modified value, etc.) for the first parameter may be indicated by a configured search space set. For example, in some cases, UE 115-*b* and/or base station 105-*b* may identify that, among one or more search space sets associated with the CORESET, a search space set configuration is associated with the WUS. The UE 115-*b* and/or base station 105-*b* may then determine that the search space set configuration indicates the second value of the first parameter, and the UE 115-*b* and/or base station 105-*b* may modify the first value of the first parameter to be the second value for the monitoring for the WUS (based on the search space set configuration, and the CORESET usage, being associated with the WUS).

At 525, base station 105-*b* may transmit a WUS according to the CORESET with the second value set for the first configuration parameter. Further, at 525, UE 115-*b* may monitor for the WUS in the identified CORESET according to the determined second value of the first parameter and the values of the one or more additional parameters, and the UE 115-*b* may receive the WUS based on the monitoring.

At 530, UE 115-*b* may transition to an active state based on receiving the WUS. For example, UE 115-*b* may receive a WUS during a WUS occasion at 525, and the UE 115-*b* may transition to an active state at 530. For example, as part of transitioning to an active state, UE 115-*b* may power additional RF circuitry for a full connected state at 530.

At 535, base station 105-*b* may transmit PDCCH (e.g., uplink/downlink scheduling data) to UE 115-*b*. In some cases, the WUS transmitted by base station 105-*b* at 525 may include configuration information for UE 115-*b* to receive the PDCCH at 353.

Figure 6:
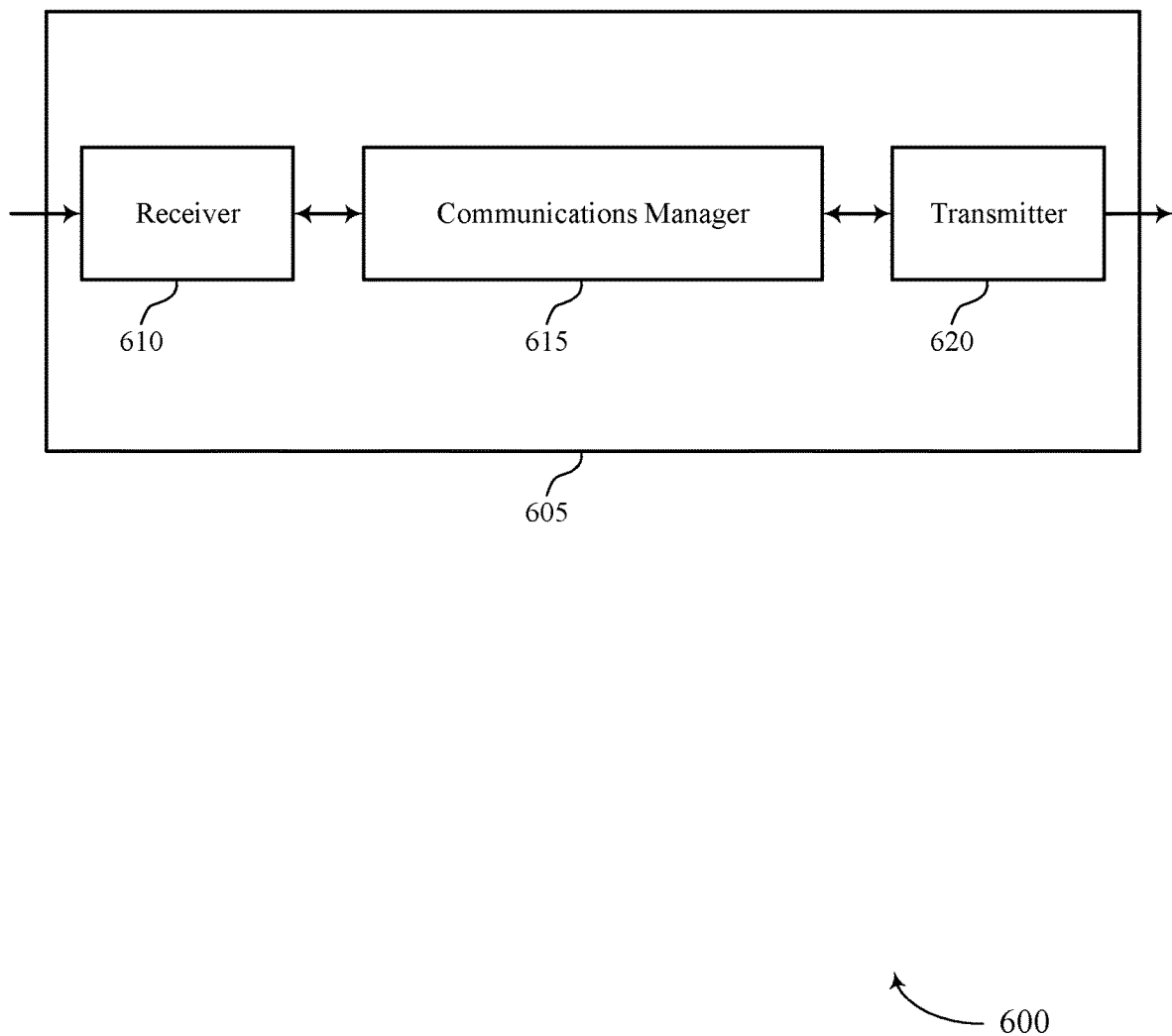
FIGS. 6 and 7 show block diagrams of devices that support configuration of control resources for wake-up signaling in accordance with aspects of the present disclosure.

FIG. 6 shows a block diagram 600 of a device 605 that supports configuration of control resources for wake-up signaling in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to configuration of control resources for wake-up signaling, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a control resource set configuration that includes a first value of a first parameter and values of one or more additional parameters, identify a control resource set to monitor for a wake-up signal based on the identified control resource set configuration, monitor for the wake-up signal in the identified control resource set according to the determined second value of the first parameter and the values of the one or more additional parameters, and determine a second value of the first parameter based on the control resource set being associated with the wake-up signal. The communications manager 615 may be an example of aspects of the communications manager 910 described herein.

The actions performed by the communications manager 615 as described herein may be implemented to realize one or more potential advantages. One implementation may allow a UE 115 to save power and increase battery life due to the decreased complexity of utilizing shared CORESET configurations. Another implementation may provide improved quality and reliability of service at the UE 115, as the number of separate resources allocated to the UE 115 may be reduced.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
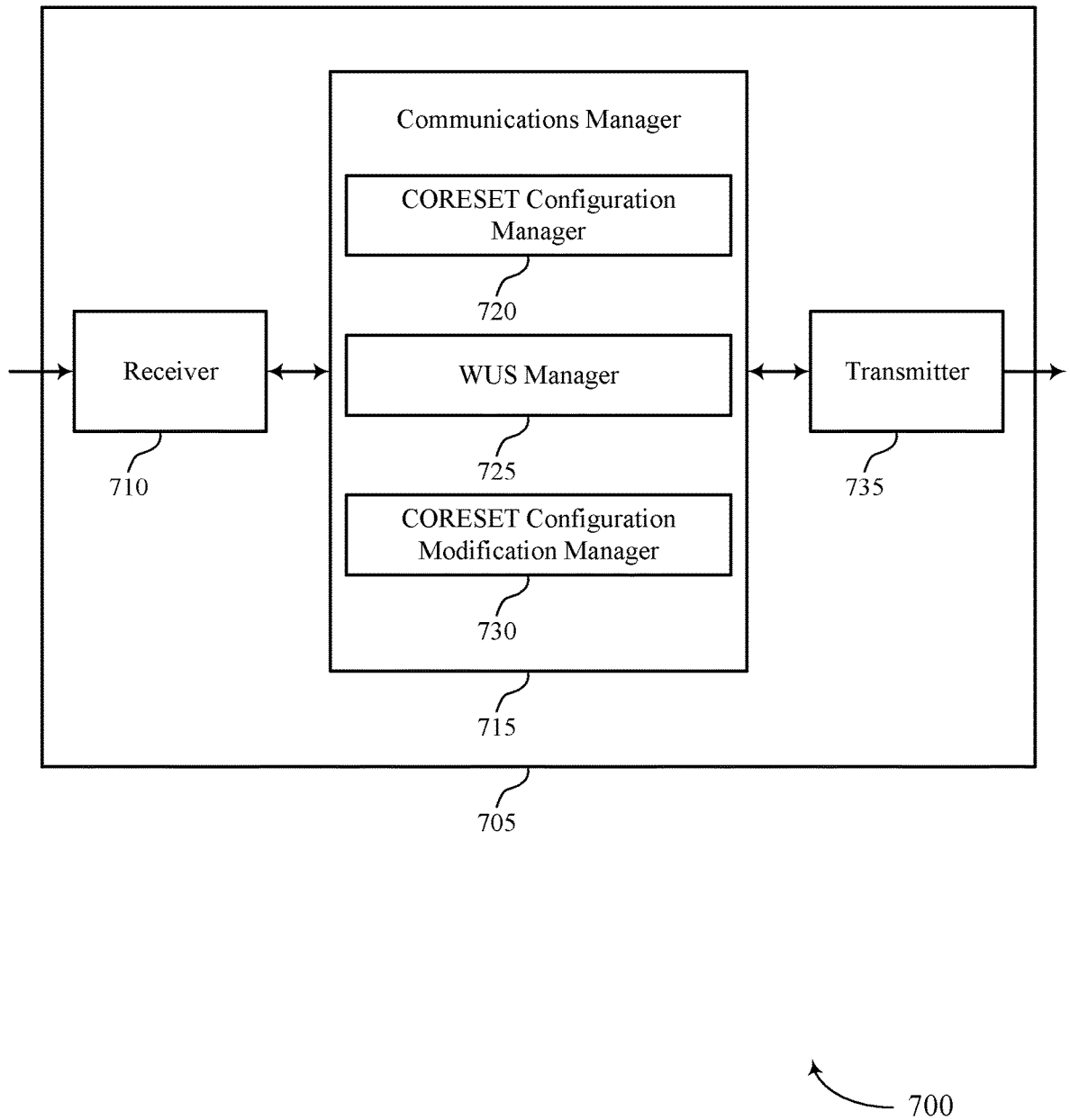

FIG. 7 shows a block diagram 700 of a device 705 that supports configuration of control resources for wake-up signaling in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to configuration of control resources for wake-up signaling, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CORESET configuration manager 720, a WUS manager 725, and a CORESET configuration modification manager 730. The communications manager 715 may be an example of aspects of the communications manager 910 described herein.

The CORESET configuration manager 720 may identify a control resource set configuration that includes a first value of a first parameter and values of one or more additional parameters. The WUS manager 725 may identify a control resource set to monitor for a wake-up signal based on the identified control resource set configuration and monitor for the wake-up signal in the identified control resource set according to the determined second value of the first parameter and the values of the one or more additional parameters. The CORESET configuration modification manager 730 may determine a second value of the first parameter based on the control resource set being associated with the wake-up signal.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
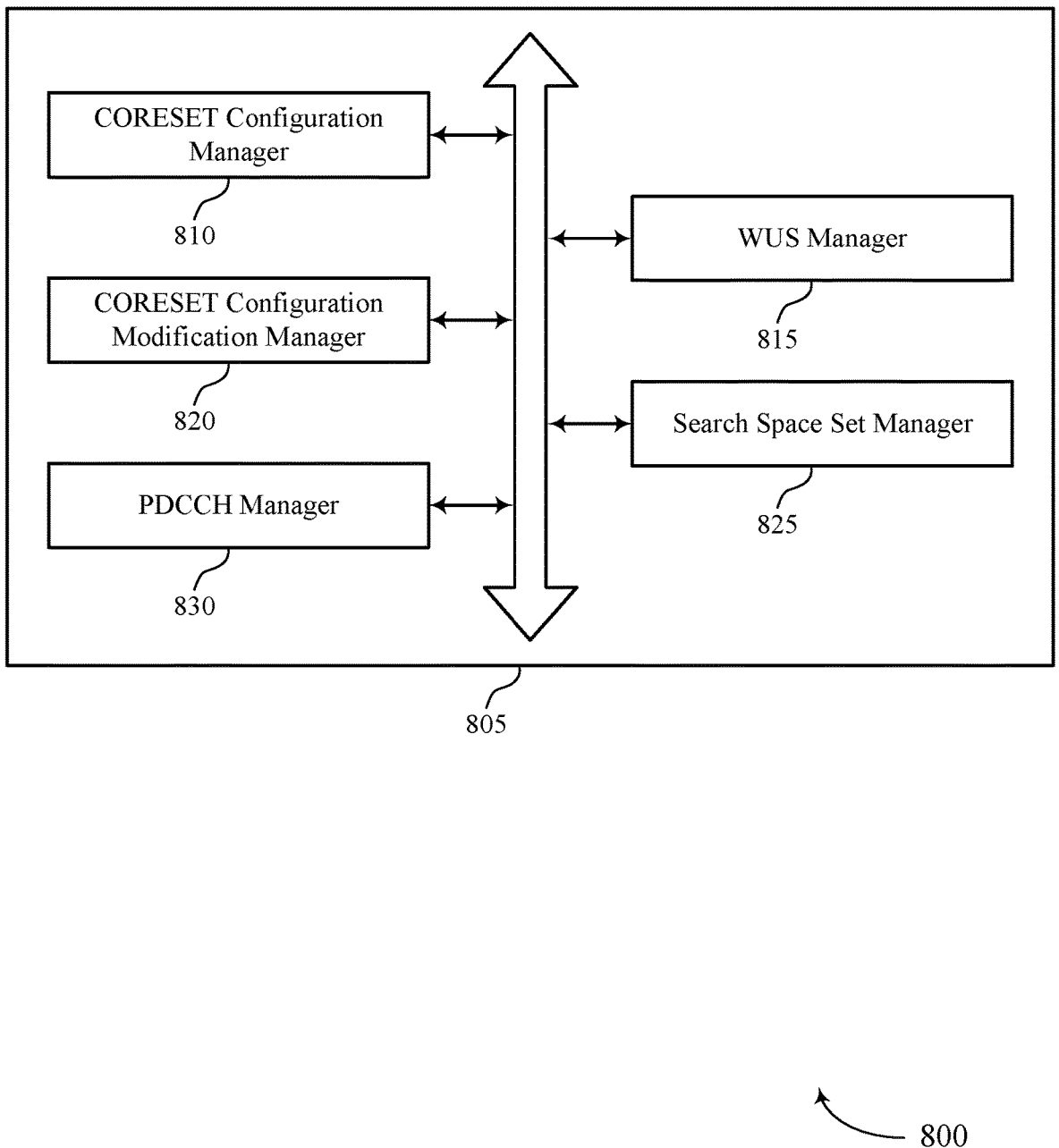
FIG. 8 shows a block diagram of a communications manager that supports configuration of control resources for wake-up signaling in accordance with aspects of the present disclosure.

FIG. 8 shows a block diagram 800 of a communications manager 805 that supports configuration of control resources for wake-up signaling in accordance with aspects of the present disclosure. The communications manager 805 may be an example of aspects of a communications manager 615, a communications manager 715, or a communications manager 910 described herein. The communications manager 805 may include a CORESET configuration manager 810, a WUS manager 815, a CORESET configuration modification manager 820, a search space set manager 825, and a PDCCH manager 830. Each of these modules may communicate, directly or indirectly, with one another (e.g., via one or more buses).

The CORESET configuration manager 810 may identify a control resource set configuration that includes a first value of a first parameter and values of one or more additional parameters. In some cases, the first parameter includes an interleaving pattern, a precoding granularity, a CCE-to-REG mapping, a time duration, a scrambling identification, or a combination thereof. In some cases, the one or more additional parameters include a time resource, a frequency resource, a TCI state, or a combination thereof.

The WUS manager 815 may identify a control resource set to monitor for a wake-up signal based on the identified control resource set configuration. In some examples, the WUS manager 815 may monitor for the wake-up signal in the identified control resource set according to the determined second value of the first parameter and the values of the one or more additional parameters. In some examples, the WUS manager 815 may identify the control resource set is configured outside of a discontinuous reception active time duration. In some examples, the WUS manager 815 may receive the wake-up signal based on the monitoring.

The CORESET configuration modification manager 820 may determine a second value of the first parameter based on the control resource set being associated with the wake-up signal. In some examples, the CORESET configuration modification manager 820 may identify a second control resource set configuration that includes at least the second value of the first parameter, where the identified control resource set configuration is for control resource sets during an active state of the UE, and the second control resource set configuration is for control resource sets, including the identified control resource set, outside the active state of the UE. In some examples, the CORESET configuration modification manager 820 may determine the second value of the first parameter from the second control resource set configuration.

In some examples, the CORESET configuration modification manager 820 may modify the first value of the first parameter to be the second value based on identifying that the identified control resource set is associated with the wake-up signal. In some examples, the CORESET configuration modification manager 820 may modify the first value to be the second value for the monitoring for the wake-up signal based on the search space set configuration being associated with the wake-up signal. In some examples, the CORESET configuration modification manager 820 may determine to use the second value based on the search space set configuration not being associated with the wake-up signal. In some examples, the CORESET configuration modification manager 820 may determine a bandwidth associated with the control resource set is above a threshold, where the second value of the first parameter is determined based on the determination that the bandwidth associated with the control resource set is above the threshold.

In some examples, the CORESET configuration modification manager 820 may determine a bandwidth associated with the control resource set is below a threshold, where the second value of the first parameter is determined based on the determination that the bandwidth associated with the control resource set is below the threshold. In some examples, the CORESET configuration modification manager 820 may determine a number of UEs in a wake-up group associated with the monitoring for the wake-up signal is above a threshold, where the second value of the first parameter is determined based on the determination that the number of UEs in the wake-up group associated with the monitoring for the wake-up signal is above the threshold.

In some examples, the CORESET configuration modification manager 820 may determine a number of UEs in a wake-up group associated with the monitoring for the wake-up signal is below a threshold, where the second value of the first parameter is determined based on the determination that the number of UEs in the wake-up group associated with the monitoring for the wake-up signal is below the threshold. In some examples, the CORESET configuration modification manager 820 may identify a time duration for which the determined second value of the first parameter is valid. In some examples, the CORESET configuration modification manager 820 may switch the first parameter back to the first value after the identified time duration.

In some examples, the CORESET configuration modification manager 820 may transmit an indication of the time duration, the second value, or both, where the second value is determined based on the transmitted indication. In some examples, the CORESET configuration modification manager 820 may receive an indication of the time duration, the second value, or both, where the second value is determined based on the received indication.

The search space set manager 825 may identify a wake-up signal search space set associated with the control resource set. In some examples, the search space set manager 825 may identify that, among one or more search space sets associated with the control resource set, a search space set configuration is associated with the wake-up signal. In some examples, the search space set manager 825 may determine that the search space set configuration indicates the second value of the first parameter. In some examples, the search space set manager 825 may identify a search space set configuration that indicates the second value of the first parameter.

The PDCCH manager 830 may monitor for a scheduling transmission during an active state of the UE based on the received wake-up signal and the second value of the first parameter.

Figure 9:
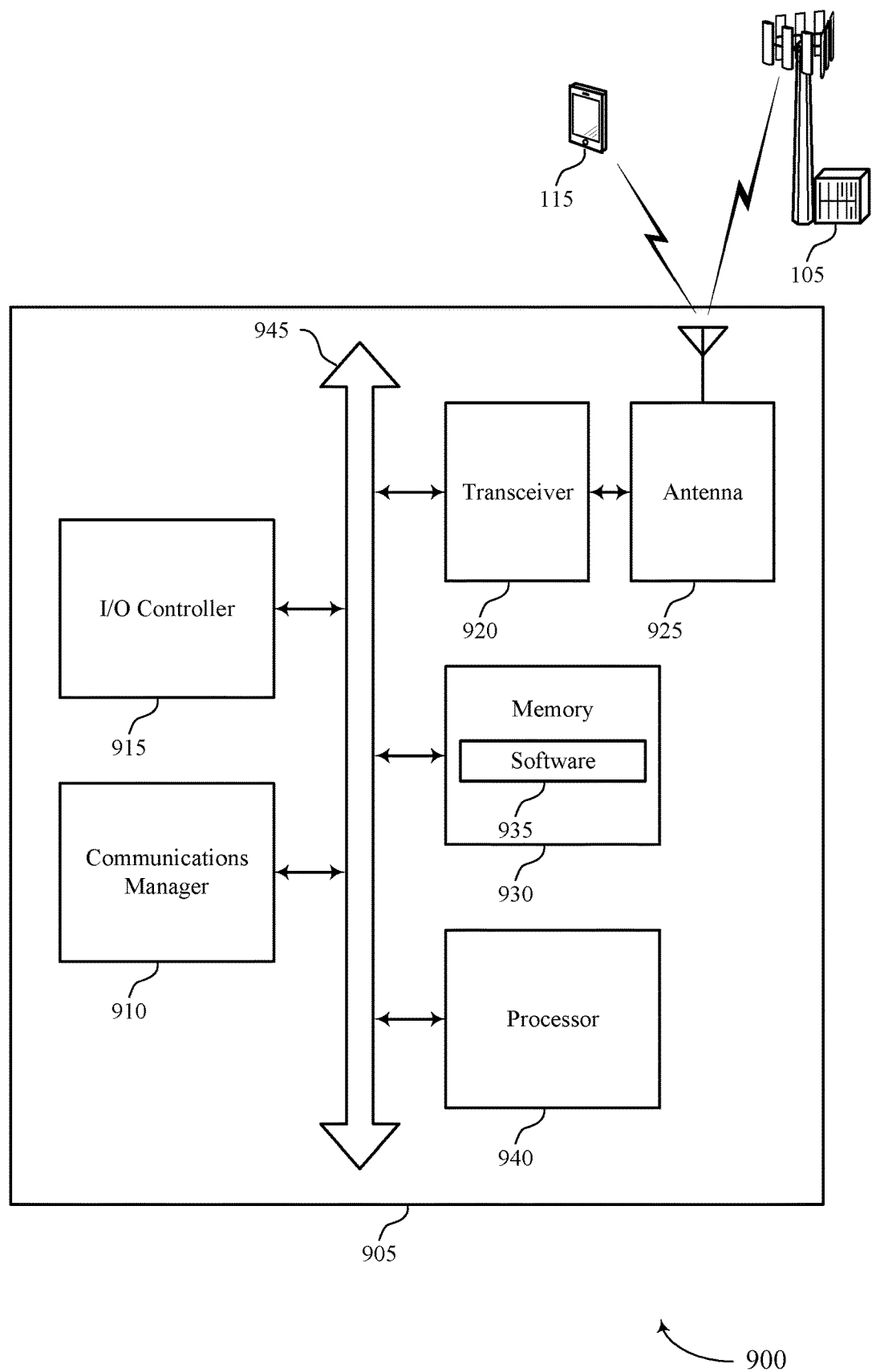
FIG. 9 shows a diagram of a system including a device that supports configuration of control resources for wake-up signaling in accordance with aspects of the present disclosure.

FIG. 9 shows a diagram of a system 900 including a device 905 that supports configuration of control resources for wake-up signaling in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a control resource set configuration that includes a first value of a first parameter and values of one or more additional parameters, identify a control resource set to monitor for a wake-up signal based on the identified control resource set configuration, monitor for the wake-up signal in the identified control resource set according to the determined second value of the first parameter and the values of the one or more additional parameters, and determine a second value of the first parameter based on the control resource set being associated with the wake-up signal.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code or software 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting configuration of control resources for wake-up signaling).

Based on sharing CORESET configurations, a processor of a UE 115 may maintain the number of CORESETs usable by UE 115 during UE active time. As such, when a resource is received, the processor may be ready to respond more efficiently through the reduction of a ramp up in processing power.

The software 935 may include instructions to implement aspects of the present disclosure, including instructions to support wireless communications. The software 935 may be stored in a non-transitory computer-readable medium such as system memory or other type of memory. In some cases, the software 935 may not be directly executable by the processor 940 but may cause a computer (e.g., when compiled and executed) to perform functions described herein.

Figure 10:
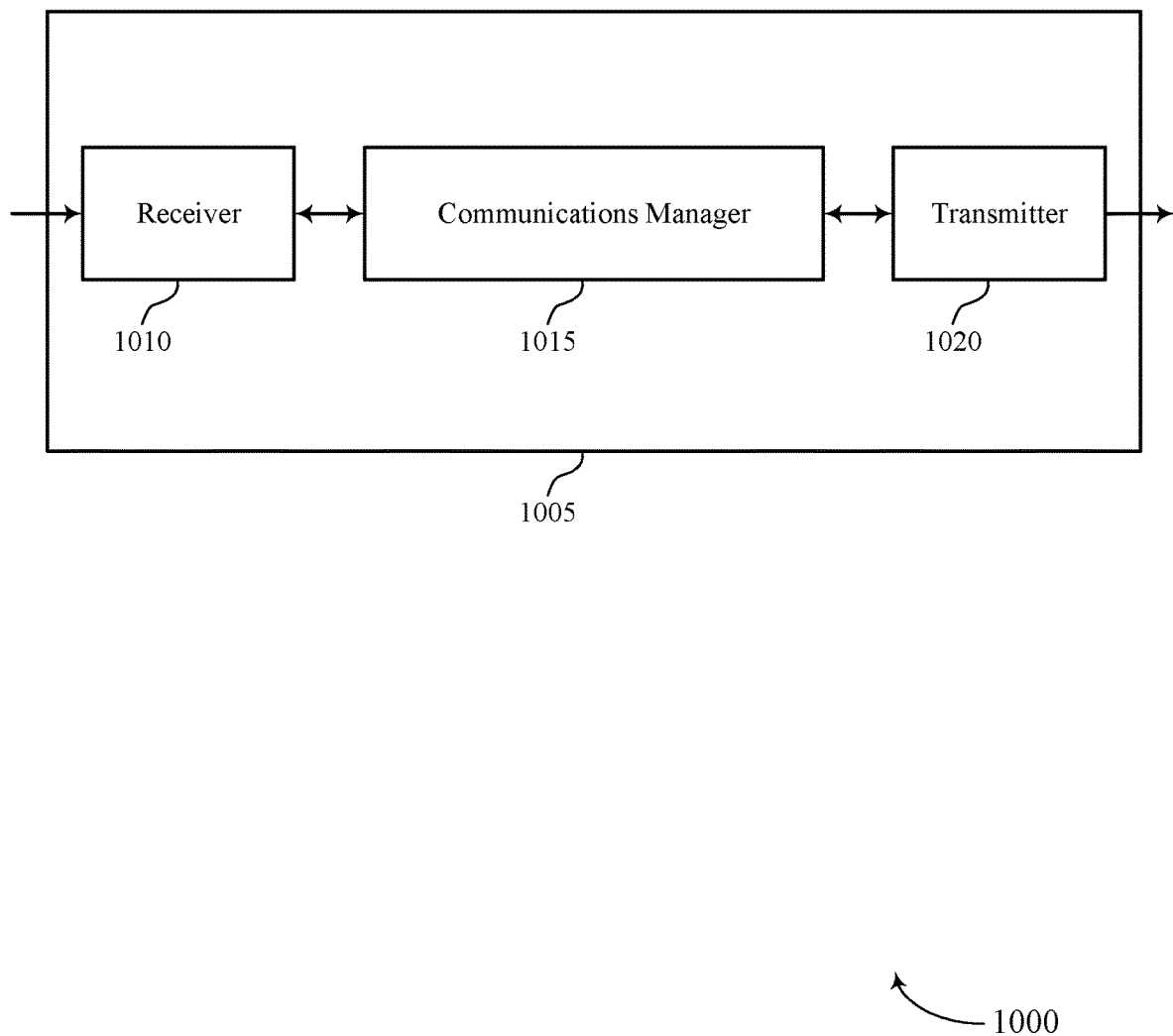
FIGS. 10 and 11 show block diagrams of devices that support configuration of control resources for wake-up signaling in accordance with aspects of the present disclosure.

FIG. 10 shows a block diagram 1000 of a device 1005 that supports configuration of control resources for wake-up signaling in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to configuration of control resources for wake-up signaling, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify, for a UE, a control resource set configuration that includes a first value of a first parameter and values of one or more additional parameters, identify a control resource set in which to transmit a wake-up signal to the UE based on the identified control resource set configuration, transmit the wake-up signal in the identified control resource set according to the determined second value of the first parameter and the values of the one or more additional parameters, and determine a second value of the first parameter based on the control resource set in which the wake-up signal is to be transmitted being associated with the wake-up signal. The communications manager 1015 may be an example of aspects of the communications manager 1310 described herein.

The actions performed by the communications manager 1015 as described herein may be implemented to realize one or more potential advantages. One implementation may allow a base station 105 to save power due to the decreased complexity of utilizing shared CORESET configurations. Another implementation may provide improved quality and reliability of service at the base station 105, as the number of separate resources allocated by the base station 105 may be reduced.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
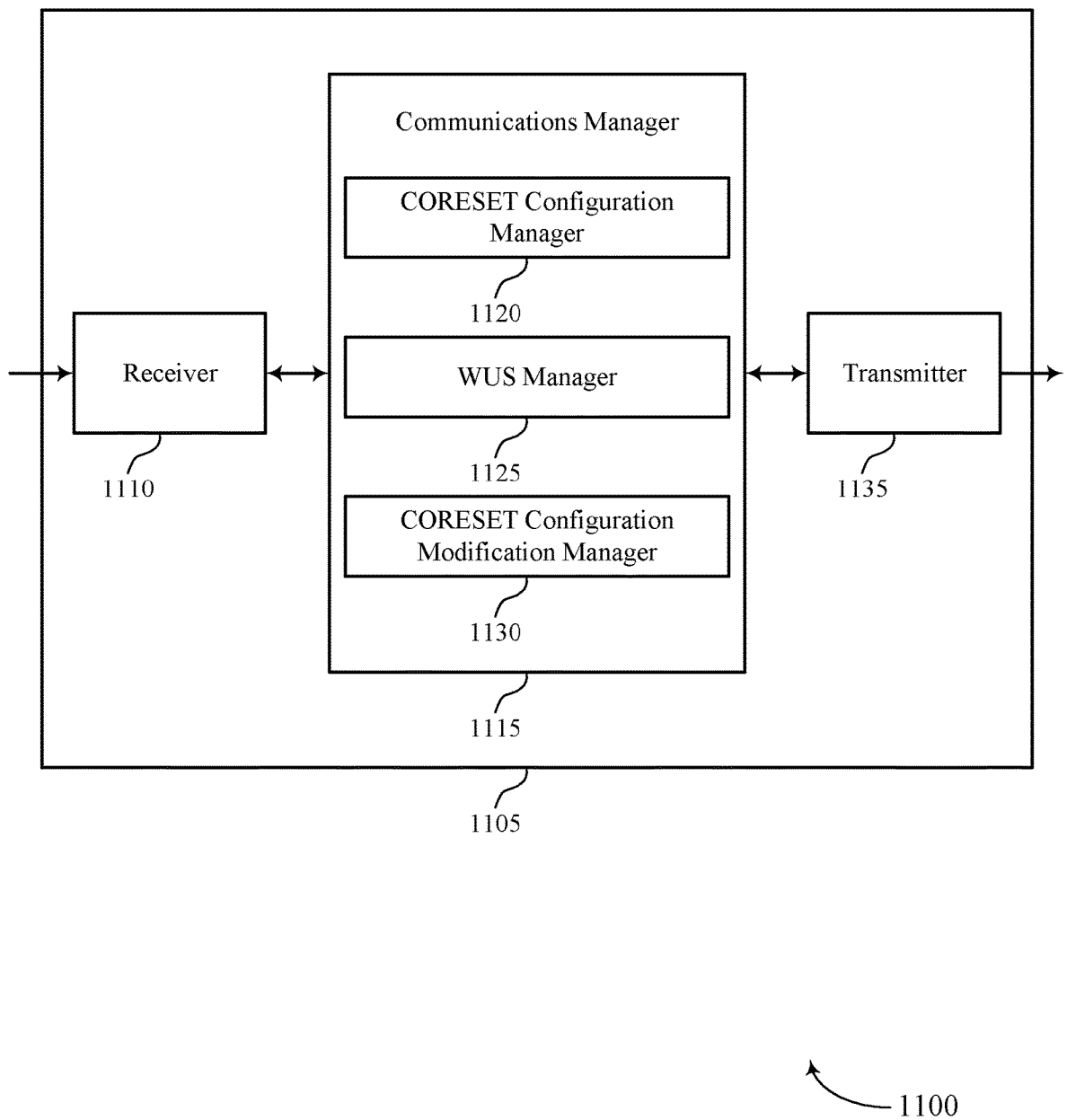

FIG. 11 shows a block diagram 1100 of a device 1105 that supports configuration of control resources for wake-up signaling in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to configuration of control resources for wake-up signaling, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CORESET configuration manager 1120, a WUS manager 1125, and a CORESET configuration modification manager 1130. The communications manager 1115 may be an example of aspects of the communications manager 1310 described herein.

The CORESET configuration manager 1120 may identify, for a UE, a control resource set configuration that includes a first value of a first parameter and values of one or more additional parameters. The WUS manager 1125 may identify a control resource set in which to transmit a wake-up signal to the UE based on the identified control resource set configuration and transmit the wake-up signal in the identified control resource set according to the determined second value of the first parameter and the values of the one or more additional parameters. The CORESET configuration modification manager 1130 may determine a second value of the first parameter based on the control resource set in which the wake-up signal is to be transmitted being associated with the wake-up signal.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
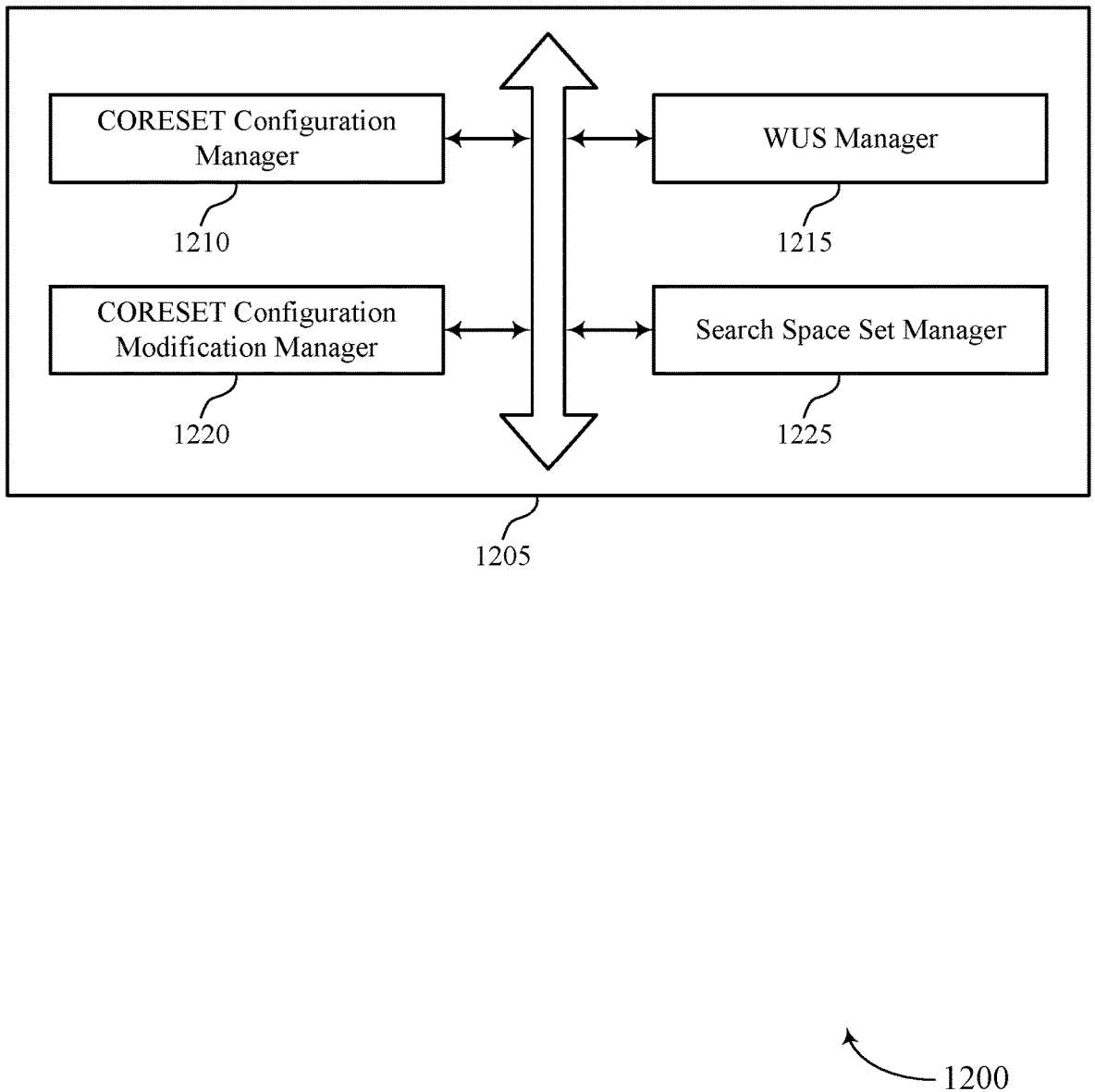
FIG. 12 shows a block diagram of a communications manager that supports configuration of control resources for wake-up signaling in accordance with aspects of the present disclosure.

FIG. 12 shows a block diagram 1200 of a communications manager 1205 that supports configuration of control resources for wake-up signaling in accordance with aspects of the present disclosure. The communications manager 1205 may be an example of aspects of a communications manager 1015, a communications manager 1115, or a communications manager 1310 described herein. The communications manager 1205 may include a CORESET configuration manager 1210, a WUS manager 1215, a CORESET configuration modification manager 1220, and a search space set manager 1225. Each of these modules may communicate, directly or indirectly, with one another (e.g., via one or more buses).

The CORESET configuration manager 1210 may identify, for a UE, a control resource set configuration that includes a first value of a first parameter and values of one or more additional parameters. In some cases, the first parameter includes an interleaving pattern, a precoding granularity, a CCE-to-REG mapping, a time duration, a scrambling identification, or a combination thereof. In some cases, the one or more additional parameters include a time resource, a frequency resource, a TCI state, or a combination thereof.

The WUS manager 1215 may identify a control resource set in which to transmit a wake-up signal to the UE based on the identified control resource set configuration. In some examples, the WUS manager 1215 may transmit the wake-up signal in the identified control resource set according to the determined second value of the first parameter and the values of the one or more additional parameters. In some examples, the WUS manager 1215 may identify the control resource set is configured outside of a discontinuous reception active time duration.

The CORESET configuration modification manager 1220 may determine a second value of the first parameter based on the control resource set in which the wake-up signal is to be transmitted being associated with the wake-up signal. In some examples, the CORESET configuration modification manager 1220 may identify a second control resource set configuration of the UE that includes at least the second value of the first parameter, where the identified control resource set configuration is for control resource sets during an active state of the UE, and the second control resource set configuration is for control resource sets, including the identified control resource set, outside the active state of the UE.

In some examples, the CORESET configuration modification manager 1220 may determine the second value of the first parameter from the second control resource set configuration. In some examples, the CORESET configuration modification manager 1220 may modify the first value of the first parameter to be the second value based on identifying that the identified control resource set is associated with the wake-up signal. In some examples, the CORESET configuration modification manager 1220 may modify the first value to be the second value for the monitoring for the wake-up signal based on the search space set configuration being associated with the wake-up signal. In some examples, the CORESET configuration modification manager 1220 may determine to use the second value based on the search space set configuration not being associated with the wake-up signal.

In some examples, the CORESET configuration modification manager 1220 may determine a bandwidth associated with the control resource set is above a threshold, where the second value of the first parameter is determined based on the determination that the bandwidth associated with the control resource set is above the threshold. In some examples, the CORESET configuration modification manager 1220 may determine a bandwidth associated with the control resource set is below a threshold, where the second value of the first parameter is determined based on the determination that the bandwidth associated with the control resource set is below the threshold. In some examples, the CORESET configuration modification manager 1220 may determine a number of UEs in a wake-up group associated with the transmitting of the wake-up signal is above a threshold, where the second value of the first parameter is determined based on the determination that the number of UEs in the wake-up group associated with the transmitting of the wake-up signal is above the threshold.

In some examples, the CORESET configuration modification manager 1220 may determine a number of UEs in a wake-up group associated with the transmitting of the wake-up signal is below a threshold, where the second value of the first parameter is determined based on the determination that the number of UEs in the wake-up group associated with the transmitting of the wake-up signal is below the threshold. In some examples, the CORESET configuration modification manager 1220 may identify a time duration for which the determined second value of the first parameter is valid. In some examples, the CORESET configuration modification manager 1220 may switch the first parameter back to the first value after the identified time duration. In some examples, the CORESET configuration modification manager 1220 may transmit an indication of the time duration, the second value, or both, where the second value is determined based on the transmitted indication. In some examples, the CORESET configuration modification manager 1220 may receive an indication of the time duration, the second value, or both, where the second value is determined based on the received indication.

The search space set manager 1225 may identify a wake-up signal search space set associated with the control resource set. In some examples, the search space set manager 1225 may identify that, among one or more search space sets associated with the control resource set, a search space set configuration is associated with the wake-up signal. In some examples, the search space set manager 1225 may determine that the search space set configuration indicates the second value of the first parameter. In some examples, the search space set manager 1225 may identify a search space set configuration that indicates the second value of the first parameter.

Figure 13:
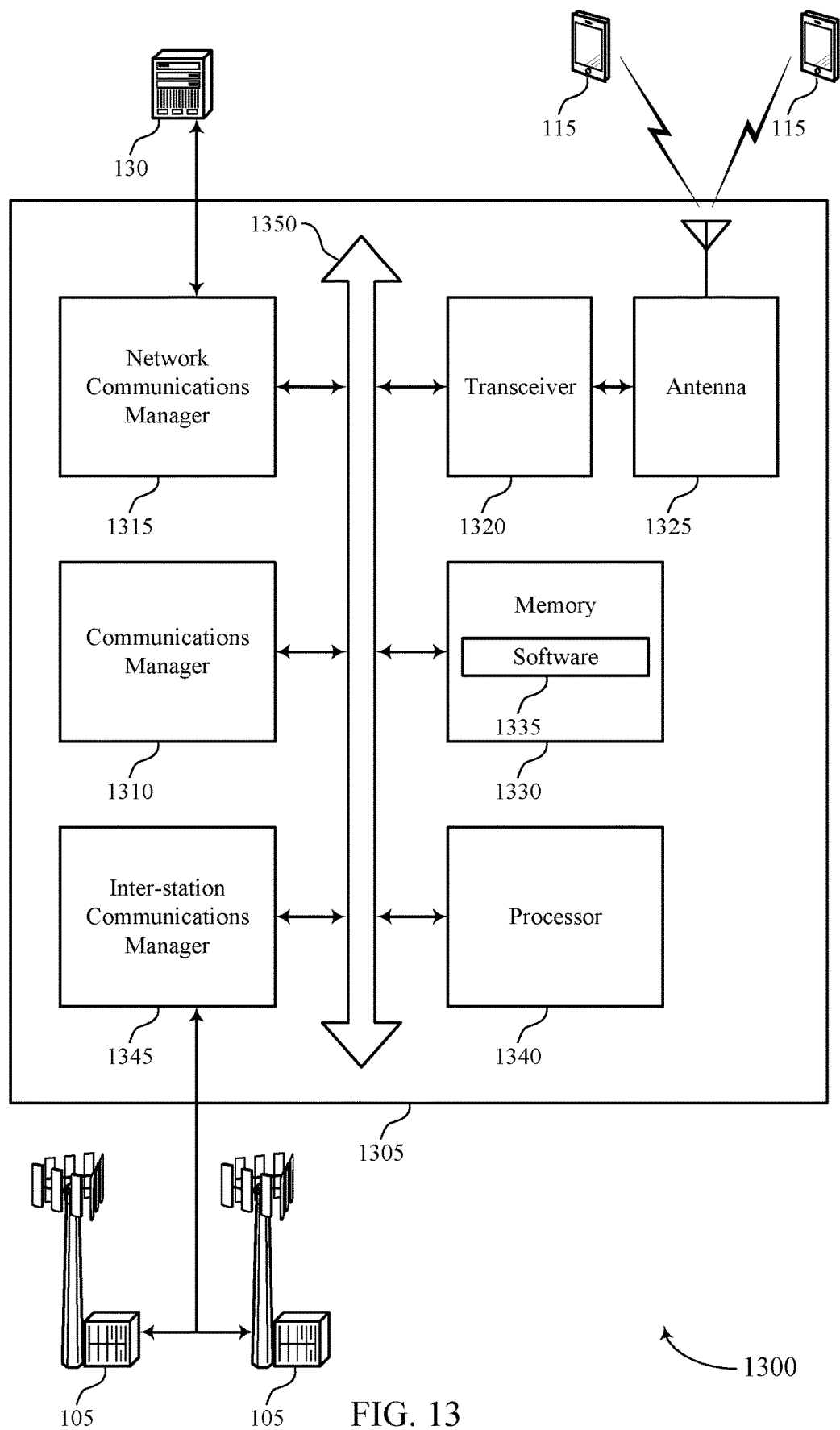
FIG. 13 shows a diagram of a system including a device that supports configuration of control resources for wake-up signaling in accordance with aspects of the present disclosure.

FIG. 13 shows a diagram of a system 1300 including a device 1305 that supports configuration of control resources for wake-up signaling in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify, for a UE, a control resource set configuration that includes a first value of a first parameter and values of one or more additional parameters, identify a control resource set in which to transmit a wake-up signal to the UE based on the identified control resource set configuration, transmit the wake-up signal in the identified control resource set according to the determined second value of the first parameter and the values of the one or more additional parameters, and determine a second value of the first parameter based on the control resource set in which the wake-up signal is to be transmitted being associated with the wake-up signal.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code or software 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting configuration of control resources for wake-up signaling).

Based on sharing CORESET configurations, a processor of a base station 105 may improve CORESET configuration for WUS monitoring and/or PDCCH monitoring without dedicatedly configuring separate CORESETs for WUS monitoring and PDCCH monitoring. As such, the processor may be ready to respond more efficiently through the reduction of a ramp up in processing power.

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
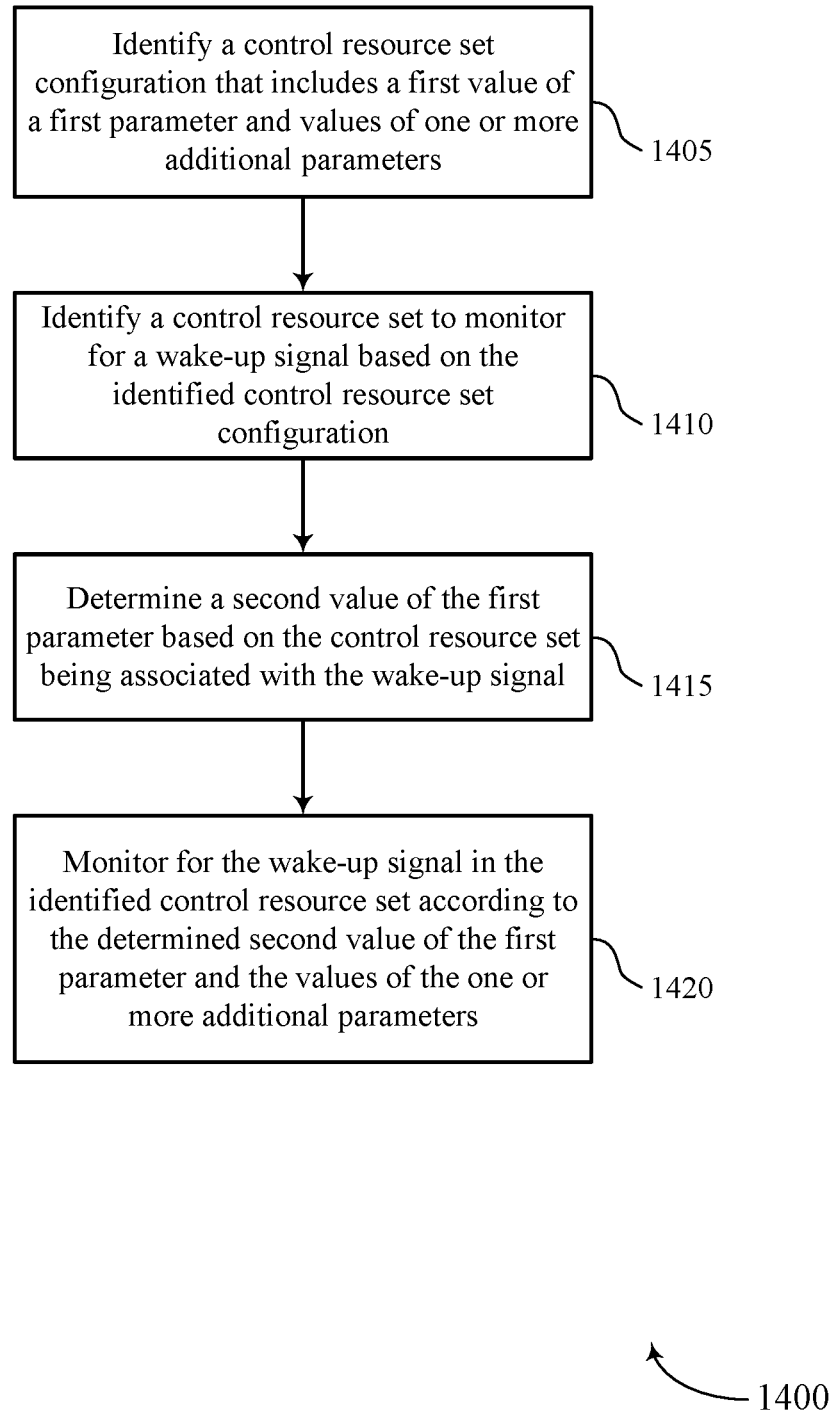
FIGS. 14 through 18 show flowcharts illustrating methods that support configuration of control resources for wake-up signaling in accordance with aspects of the present disclosure.

FIG. 14 shows a flowchart illustrating a method 1400 that supports configuration of control resources for wake-up signaling in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a control resource set configuration that includes a first value of a first parameter and values of one or more additional parameters. The operations of 1405 may be performed according to the methods described herein. In some examples, aspects of the operations of 1405 may be performed by a CORESET configuration manager as described with reference to FIGS. 6 through 9.

At 1410, the UE may identify a control resource set to monitor for a wake-up signal based on the identified control resource set configuration. The operations of 1410 may be performed according to the methods described herein. In some examples, aspects of the operations of 1410 may be performed by a WUS manager as described with reference to FIGS. 6 through 9.

At 1415, the UE may determine a second value of the first parameter based on the control resource set being associated with the wake-up signal. The operations of 1415 may be performed according to the methods described herein. In some examples, aspects of the operations of 1415 may be performed by a CORESET configuration modification manager as described with reference to FIGS. 6 through 9.

At 1420, the UE may monitor for the wake-up signal in the identified control resource set according to the determined second value of the first parameter and the values of the one or more additional parameters. The operations of 1420 may be performed according to the methods described herein. In some examples, aspects of the operations of 1420 may be performed by a WUS manager as described with reference to FIGS. 6 through 9.

Figure 15:
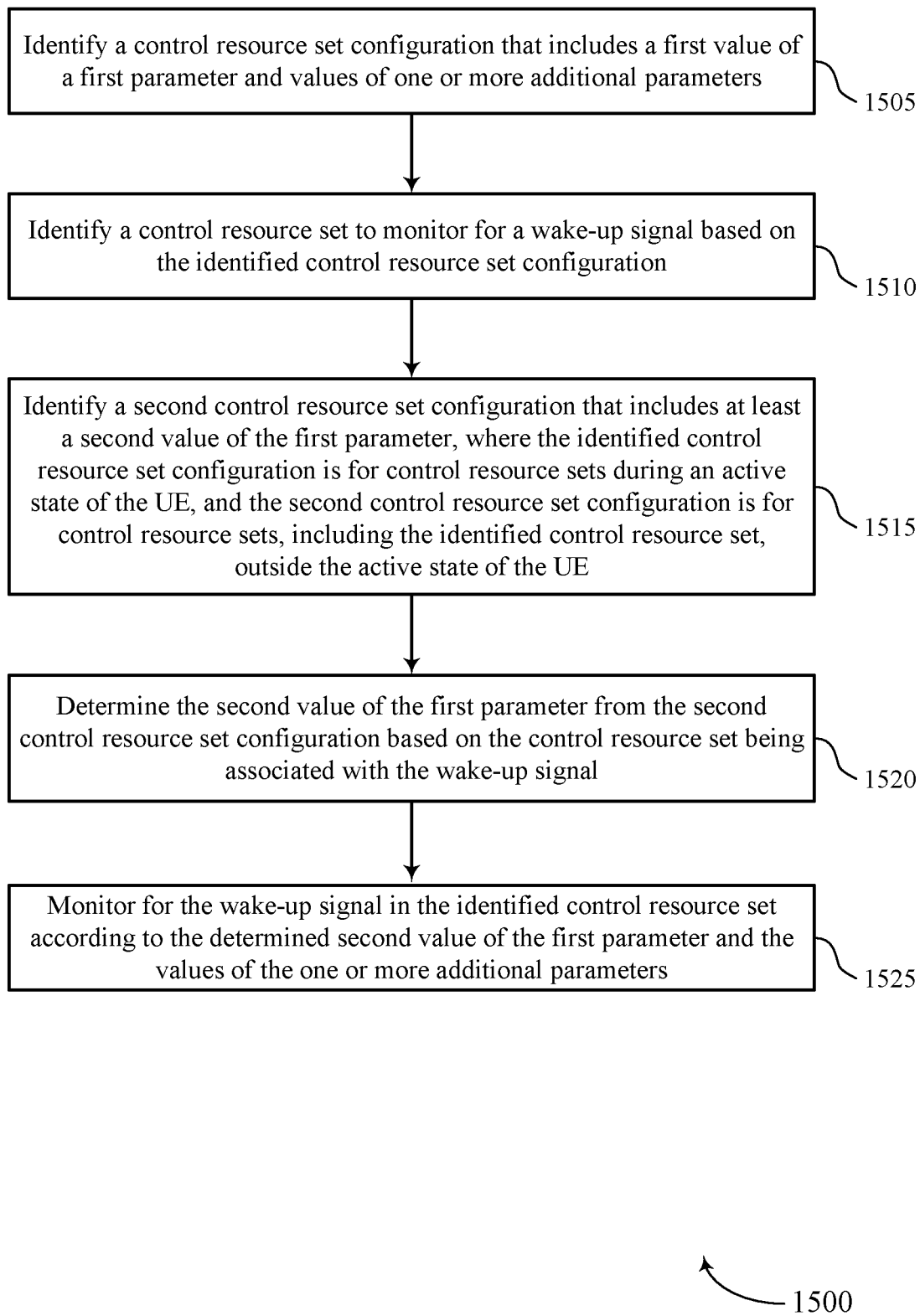

FIG. 15 shows a flowchart illustrating a method 1500 that supports configuration of control resources for wake-up signaling in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify a control resource set configuration that includes a first value of a first parameter and values of one or more additional parameters. The operations of 1505 may be performed according to the methods described herein. In some examples, aspects of the operations of 1505 may be performed by a CORESET configuration manager as described with reference to FIGS. 6 through 9.

At 1510, the UE may identify a control resource set to monitor for a wake-up signal based on the identified control resource set configuration. The operations of 1510 may be performed according to the methods described herein. In some examples, aspects of the operations of 1510 may be performed by a WUS manager as described with reference to FIGS. 6 through 9.

At 1515, the UE may identify a second control resource set configuration that includes at least a second value of the first parameter, where the identified control resource set configuration is for control resource sets during an active state of the UE, and the second control resource set configuration is for control resource sets, including the identified control resource set, outside the active state of the UE. The operations of 1515 may be performed according to the methods described herein. In some examples, aspects of the operations of 1515 may be performed by a CORESET configuration modification manager as described with reference to FIGS. 6 through 9.

At 1520, the UE may determine the second value of the first parameter from the second control resource set configuration based on the control resource set being associated with the wake-up signal. The operations of 1520 may be performed according to the methods described herein. In some examples, aspects of the operations of 1520 may be performed by a CORESET configuration modification manager as described with reference to FIGS. 6 through 9.

At 1525, the UE may monitor for the wake-up signal in the identified control resource set according to the determined second value of the first parameter and the values of the one or more additional parameters. The operations of 1525 may be performed according to the methods described herein. In some examples, aspects of the operations of 1525 may be performed by a WUS manager as described with reference to FIGS. 6 through 9.

Figure 16:
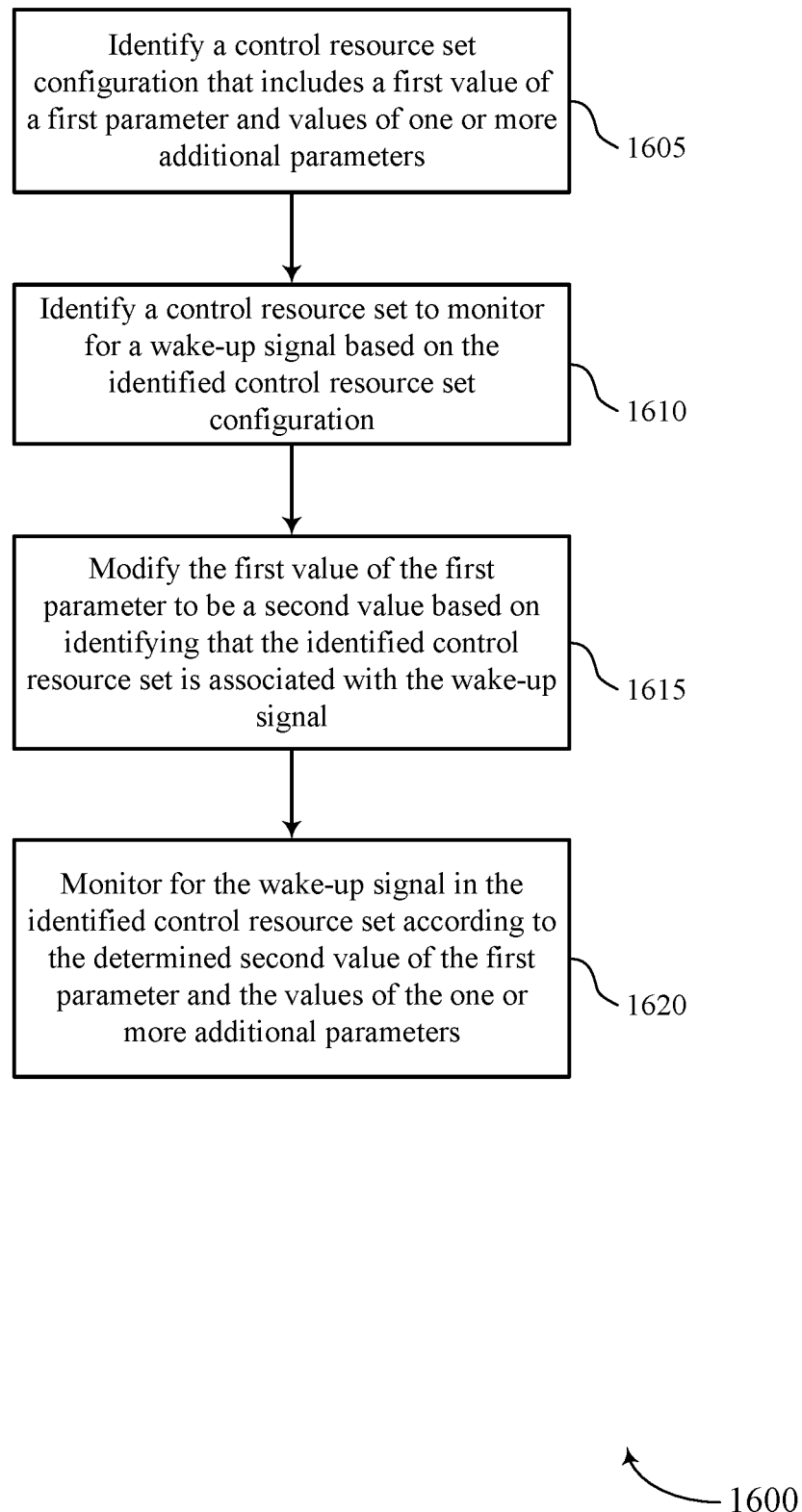

FIG. 16 shows a flowchart illustrating a method 1600 that supports configuration of control resources for wake-up signaling in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify a control resource set configuration that includes a first value of a first parameter and values of one or more additional parameters. The operations of 1605 may be performed according to the methods described herein. In some examples, aspects of the operations of 1605 may be performed by a CORESET configuration manager as described with reference to FIGS. 6 through 9.

At 1610, the UE may identify a control resource set to monitor for a wake-up signal based on the identified control resource set configuration. The operations of 1610 may be performed according to the methods described herein. In some examples, aspects of the operations of 1610 may be performed by a WUS manager as described with reference to FIGS. 6 through 9.

At 1615, the UE may modify the first value of the first parameter to be a second value based on identifying that the identified control resource set is associated with the wake-up signal. The operations of 1615 may be performed according to the methods described herein. In some examples, aspects of the operations of 1615 may be performed by a CORESET configuration modification manager as described with reference to FIGS. 6 through 9.

At 1620, the UE may monitor for the wake-up signal in the identified control resource set according to the determined second value of the first parameter and the values of the one or more additional parameters. The operations of 1620 may be performed according to the methods described herein. In some examples, aspects of the operations of 1620 may be performed by a WUS manager as described with reference to FIGS. 6 through 9.

Figure 17:
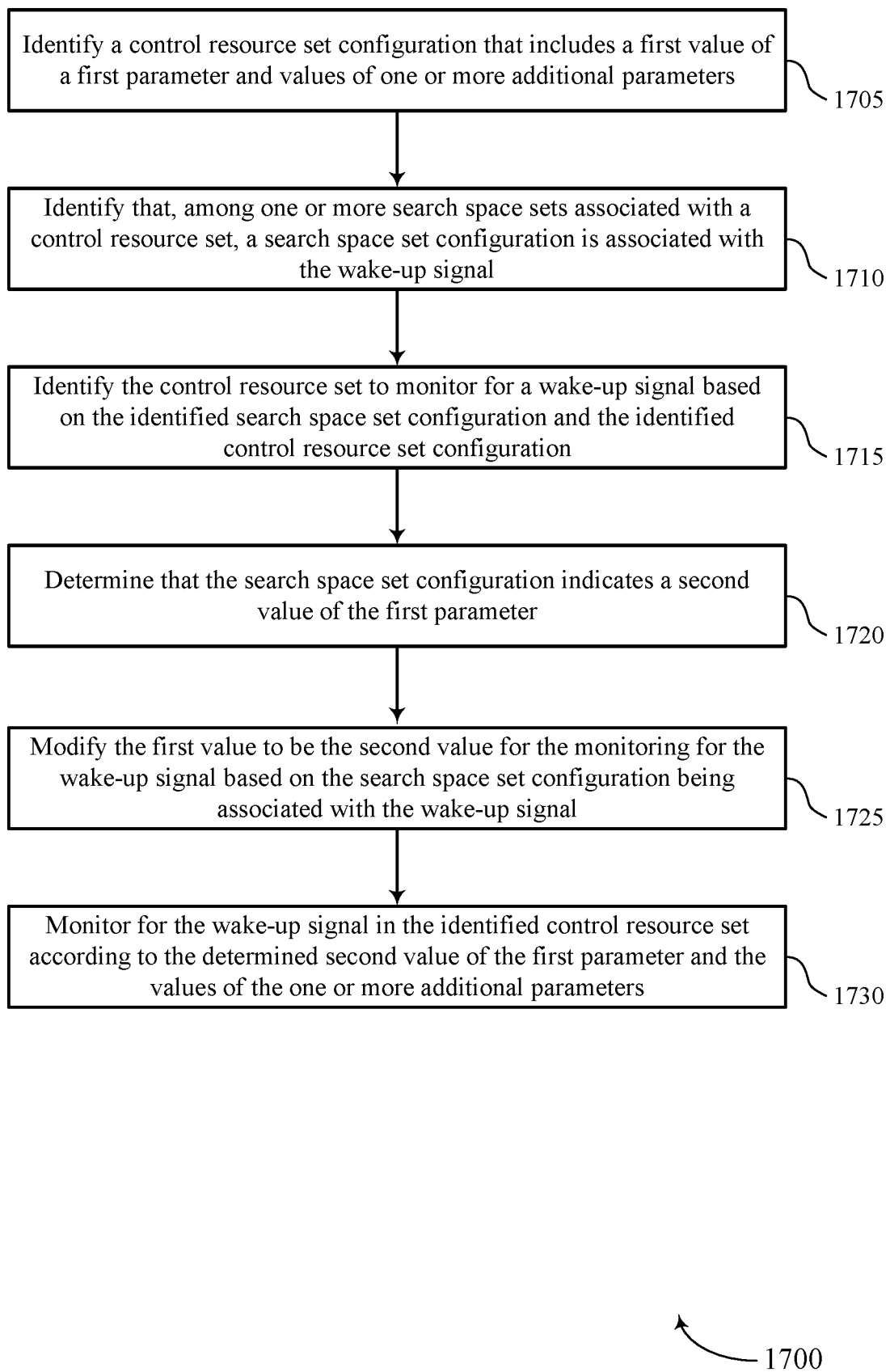

FIG. 17 shows a flowchart illustrating a method 1700 that supports configuration of control resources for wake-up signaling in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may identify a control resource set configuration that includes a first value of a first parameter and values of one or more additional parameters. The operations of 1705 may be performed according to the methods described herein. In some examples, aspects of the operations of 1705 may be performed by a CORESET configuration manager as described with reference to FIGS. 6 through 9.

At 1710, the UE may identify that, among one or more search space sets associated with a control resource set, a search space set configuration is associated with the wake-up signal. The operations of 1710 may be performed according to the methods described herein. In some examples, aspects of the operations of 1710 may be performed by a search space set manager as described with reference to FIGS. 6 through 9.

At 1715, the UE may identify the control resource set to monitor for a wake-up signal based on the identified search space set configuration and/or the identified control resource set configuration. The operations of 1715 may be performed according to the methods described herein. In some examples, aspects of the operations of 1715 may be performed by a WUS manager as described with reference to FIGS. 6 through 9.

At 1720, the UE may determine that the search space set configuration indicates a second value of the first parameter. The operations of 1720 may be performed according to the methods described herein. In some examples, aspects of the operations of 1720 may be performed by a search space set manager as described with reference to FIGS. 6 through 9.

At 1725, the UE may modify the first value to be the second value for the monitoring for the wake-up signal based on the search space set configuration being associated with the wake-up signal. The operations of 1725 may be performed according to the methods described herein. In some examples, aspects of the operations of 1725 may be performed by a CORESET configuration modification manager as described with reference to FIGS. 6 through 9.

At 1730, the UE may monitor for the wake-up signal in the identified control resource set according to the determined second value of the first parameter and the values of the one or more additional parameters. The operations of 1730 may be performed according to the methods described herein. In some examples, aspects of the operations of 1730 may be performed by a WUS manager as described with reference to FIGS. 6 through 9.

Figure 18:
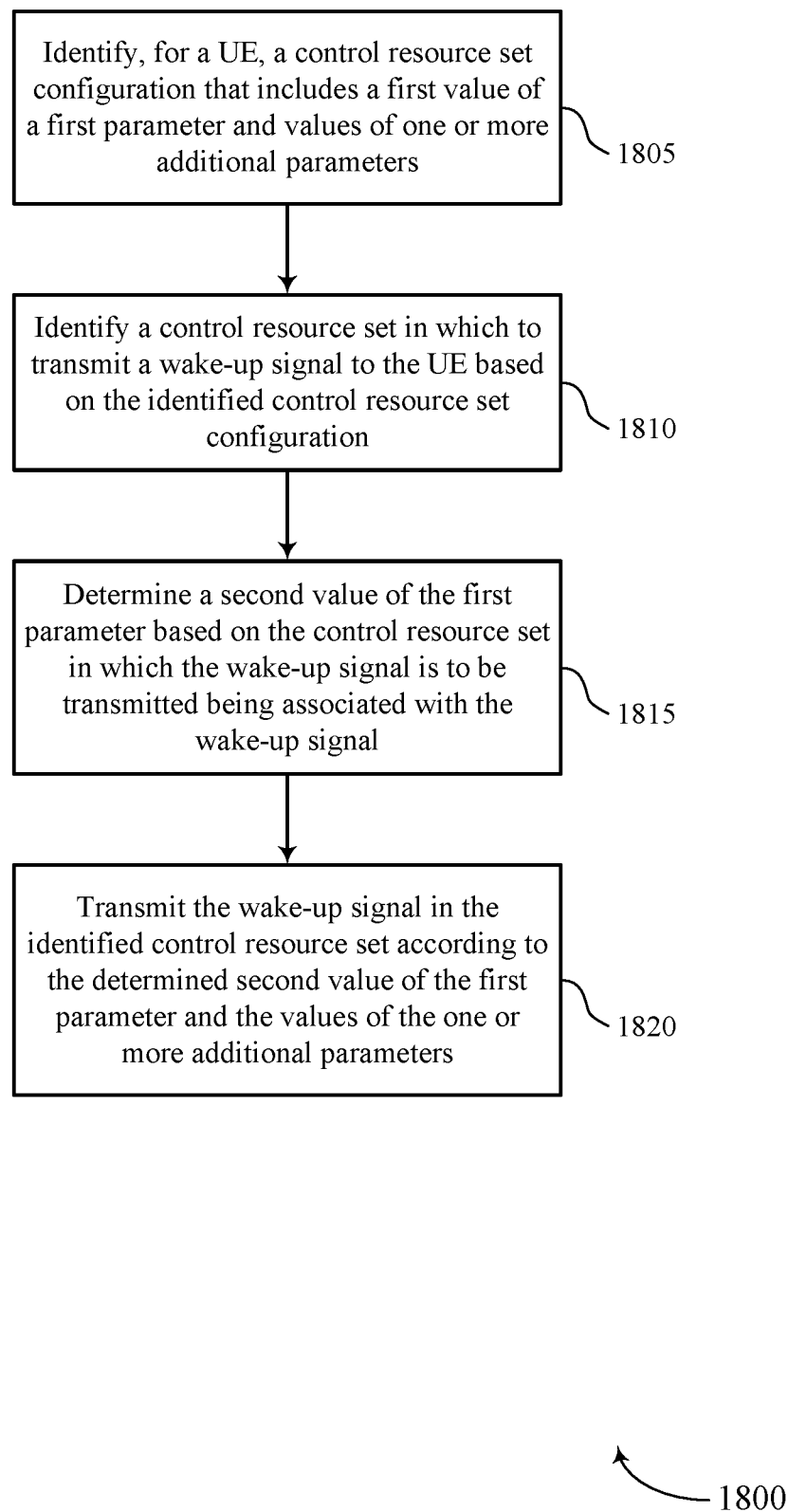

FIG. 18 shows a flowchart illustrating a method 1800 that supports configuration of control resources for wake-up signaling in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify, for a UE, a control resource set configuration that includes a first value of a first parameter and values of one or more additional parameters. The operations of 1805 may be performed according to the methods described herein. In some examples, aspects of the operations of 1805 may be performed by a CORESET configuration manager as described with reference to FIGS. 10 through 13.

At 1810, the base station may identify a control resource set in which to transmit a wake-up signal to the UE based on the identified control resource set configuration. The operations of 1810 may be performed according to the methods described herein. In some examples, aspects of the operations of 1810 may be performed by a WUS manager as described with reference to FIGS. 10 through 13.

At 1815, the base station may determine a second value of the first parameter based on the control resource set in which the wake-up signal is to be transmitted being associated with the wake-up signal. The operations of 1815 may be performed according to the methods described herein. In some examples, aspects of the operations of 1815 may be performed by a CORESET configuration modification manager as described with reference to FIGS. 10 through 13.

At 1820, the base station may transmit the wake-up signal in the identified control resource set according to the determined second value of the first parameter and the values of the one or more additional parameters. The operations of 1820 may be performed according to the methods described herein. In some examples, aspects of the operations of 1820 may be performed by a WUS manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a control resource set configuration that includes a first value of a first parameter and values of one or more additional parameters;
    identifying a control resource set to monitor for a wake-up signal based at least in part on the identified control resource set configuration;
    determining a second value of the first parameter based at least in part on the control resource set being associated with the wake-up signal; and
    monitoring for the wake-up signal in the identified control resource set according to the determined second value of the first parameter and the values of the one or more additional parameters.

2. The method of claim 1, wherein determining the second value of the first parameter based at least in part on the control resource set being associated with the wake-up signal comprises:
    identifying a second control resource set configuration that includes at least the second value of the first parameter, wherein the identified control resource set configuration is for control resource sets during an active state of the UE, and the second control resource set configuration is for control resource sets, including the identified control resource set, outside the active state of the UE; and
    determining the second value of the first parameter from the second control resource set configuration.

3. The method of claim 1, wherein determining the second value of the first parameter comprises:
    modifying the first value of the first parameter to be the second value based at least in part on identifying that the identified control resource set is associated with the wake-up signal.

4. The method of claim 1, wherein the first parameter comprises an interleaving pattern, a precoding granularity, a control channel element-to-resource element group mapping, a time duration, a scrambling identification, or a combination thereof.

5. The method of claim 1, wherein the one or more additional parameters comprise a time resource, a frequency resource, a transmission configuration indicator state, or a combination thereof.

6. The method of claim 1, wherein identifying the control resource set to monitor for the wake-up signal comprises:
    identifying a wake-up signal search space set associated with the control resource set.

7. The method of claim 1, further comprising:
    identifying a search space set configuration that indicates the second value of the first parameter; and
    determining to use the second value based at least in part on the search space set configuration being associated with the wake-up signal.

8. The method of claim 1, wherein identifying the control resource set to monitor for the wake-up signal comprises:
    identifying the control resource set is configured outside of a discontinuous reception active time duration based at least in part on a search space set configuration associated with the control resource set.

9. The method of claim 1, further comprising:
    determining a bandwidth associated with the control resource set is above a threshold, wherein the second value of the first parameter is determined based at least in part on the determination that the bandwidth associated with the control resource set is above the threshold.

10. The method of claim 1, further comprising:
    determining a bandwidth associated with the control resource set is below a threshold, wherein the second value of the first parameter is determined based at least in part on the determination that the bandwidth associated with the control resource set is below the threshold.

11. The method of claim 1, further comprising:
    determining a number of UEs in a wake-up group associated with the monitoring for the wake-up signal is above a threshold, wherein the second value of the first parameter is determined based at least in part on the determination that the number of UEs in the wake-up group associated with the monitoring for the wake-up signal is above the threshold.

12. The method of claim 1, further comprising:
    determining a number of UEs in a wake-up group associated with the monitoring for the wake-up signal is below a threshold, wherein the second value of the first parameter is determined based at least in part on the determination that the number of UEs in the wake-up group associated with the monitoring for the wake-up signal is below the threshold.

13. The method of claim 1, further comprising:
    identifying a time duration for which the determined second value of the first parameter is valid; and
    switching the first parameter back to the first value after the identified time duration.

14. The method of claim 13, further comprising:
    communicating an indication of the time duration, the second value, or both, wherein the second value is determined based at least in part on the transmitted indication.

15. The method of claim 1, further comprising:
    receiving the wake-up signal based at least in part on the monitoring; and
    monitoring for a scheduling transmission during an active state of the UE based at least in part on the received wake-up signal and the second value of the first parameter.

16. A method for wireless communication at a base station, comprising:
    identifying, for a user equipment (UE), a control resource set configuration that includes a first value of a first parameter and values of one or more additional parameters;
    identifying a control resource set in which to transmit a wake-up signal to the UE based at least in part on the identified control resource set configuration;
    determining a second value of the first parameter based at least in part on the control resource set in which the wake-up signal is to be transmitted being associated with the wake-up signal; and transmitting the wake-up signal in the identified control resource set according to the determined second value of the first parameter and the values of the one or more additional parameters.

17. The method of claim 16, wherein determining the second value of the first parameter based at least in part on the control resource set being associated with the wake-up signal comprises:

identifying a second control resource set configuration of the UE that includes at least the second value of the first parameter, wherein the identified control resource set configuration is for control resource sets during an active state of the UE, and the second control resource set configuration is for control resource sets, including the identified control resource set, outside the active state of the UE; and determining the second value of the first parameter from the second control resource set configuration.

18. The method of claim 16, wherein determining the second value of the first parameter comprises:

modifying the first value of the first parameter to be the second value based at least in part on identifying that the identified control resource set is associated with the wake-up signal.

19. The method of claim 16, wherein the first parameter comprises an interleaving pattern, a precoding granularity, a control channel element-to-resource element group mapping, a time duration, a scrambling identification, or a combination thereof.

20. The method of claim 16, wherein the one or more additional parameters comprise a time resource, a frequency resource, a transmission configuration indicator state, or a combination thereof.

21. The method of claim 16, wherein identifying the control resource set in which to transmit the wake-up signal comprises:

identifying a wake-up signal search space set associated with the control resource set.

22. The method of claim 16, further comprising:

identifying a search space set configuration that indicates the second value of the first parameter; and determining to use the second value based at least in part on the search space set configuration being associated with the wake-up signal.

23. The method of claim 16, wherein identifying the control resource set in which to transmit the wake-up signal comprises:

identifying the control resource set is configured outside of a discontinuous reception active time duration based at least in part on a search space set configuration associated with the control resource set.

24. The method of claim 16, further comprising:

determining a bandwidth associated with the control resource set is above a threshold, wherein the second value of the first parameter is determined based at least in part on the determination that the bandwidth associated with the control resource set is above the threshold.

25. The method of claim 16, further comprising:

determining a bandwidth associated with the control resource set is below a threshold, wherein the second value of the first parameter is determined based at least in part on the determination that the bandwidth associated with the control resource set is below the threshold.

26. The method of claim 16, further comprising:

determining a number of UEs in a wake-up group associated with the transmitting of the wake-up signal is above a threshold, wherein the second value of the first parameter is determined based at least in part on the determination that the number of UEs in the wake-up group associated with the transmitting of the wake-up signal is above the threshold.

27. The method of claim 16, further comprising:

determining a number of UEs in a wake-up group associated with the transmitting of the wake-up signal is below a threshold, wherein the second value of the first parameter is determined based at least in part on the determination that the number of UEs in the wake-up group associated with the transmitting of the wake-up signal is below the threshold.

28. The method of claim 16, further comprising:

identifying a time duration for which the determined second value of the first parameter is valid; and switching the first parameter back to the first value after the identified time duration.

29. The method of claim 28, further comprising:

communicating an indication of the time duration, the second value, or both, wherein the second value is determined based at least in part on the transmitted indication.

30. An apparatus for wireless communication at a user equipment (UE), comprising:

a processor, memory coupled with the processor; and instructions stored in the memory and executable by the processor to cause the apparatus to:

identify a control resource set configuration that includes a first value of a first parameter and values of one or more additional parameters;

identify a control resource set to monitor for a wake-up signal based at least in part on the identified control resource set configuration;

determine a second value of the first parameter based at least in part on the control resource set being associated with the wake-up signal; and monitor for the wake-up signal in the identified control resource set according to the determined second value of the first parameter and the values of the one or more additional parameters.

31. The apparatus of claim 30, wherein the instructions to determine the second value of the first parameter based at least in part on the control resource set being associated with the wake-up signal are executable by the processor to cause the apparatus to:

identify a second control resource set configuration that includes at least the second value of the first parameter, wherein the identified control resource set configuration is for control resource sets during an active state of the UE, and the second control resource set configuration is for control resource sets, including the identified control resource set, outside the active state of the UE; and determine the second value of the first parameter from the second control resource set configuration.

32. The apparatus of claim 30, wherein the instructions to determine the second value of the first parameter are executable by the processor to cause the apparatus to:

modify the first value of the first parameter to be the second value based at least in part on identifying that the identified control resource set is associated with the wake-up signal.

33. The apparatus of claim 30, wherein the first parameter comprises an interleaving pattern, a precoding granularity, a control channel element-to-resource element group mapping, a time duration, a scrambling identification, or a combination thereof, and wherein the one or more additional parameters comprise a time resource, a frequency resource, a transmission configuration indicator state, or a combination thereof.

34. The apparatus of claim 30, wherein the instructions to identify the control resource set to monitor for the wake-up signal are executable by the processor to cause the apparatus to:
identify a wake-up signal search space set associated with the control resource set.

35. The apparatus of claim 30, wherein the instructions are further executable by the processor to cause the apparatus to:
identify a search space set configuration that indicates the second value of the first parameter; and
determine to use the second value based at least in part on the search space set configuration being associated with the wake-up signal.

36. The apparatus of claim 30, wherein the instructions to identify the control resource set to monitor for the wake-up signal are executable by the processor to cause the apparatus to:
identify the control resource set is configured outside of a discontinuous reception active time duration based at least in part on a search space set configuration associated with the control resource set.

37. The apparatus of claim 30, wherein the instructions are further executable by the processor to cause the apparatus to:
determine a bandwidth associated with the control resource set is above a threshold, wherein the second value of the first parameter is determined based at least in part on the determination that the bandwidth associated with the control resource set is above the threshold.

38. The apparatus of claim 30, wherein the instructions are further executable by the processor to cause the apparatus to:
determine a bandwidth associated with the control resource set is below a threshold, wherein the second value of the first parameter is determined based at least in part on the determination that the bandwidth associated with the control resource set is below the threshold.

39. The apparatus of claim 30, wherein the instructions are further executable by the processor to cause the apparatus to:
determine a number of UEs in a wake-up group associated with the monitoring for the wake-up signal is above a threshold, wherein the second value of the first parameter is determined based at least in part on the determination that the number of UEs in the wake-up group associated with the monitoring for the wake-up signal is above the threshold.

40. The apparatus of claim 30, wherein the instructions are further executable by the processor to cause the apparatus to:
determine a number of UEs in a wake-up group associated with the monitoring for the wake-up signal is below a threshold, wherein the second value of the first parameter is determined based at least in part on the determination that the number of UEs in the wake-up group associated with the monitoring for the wake-up signal is below the threshold.

41. The apparatus of claim 30, wherein the instructions are further executable by the processor to cause the apparatus to:
identify a time duration for which the determined second value of the first parameter is valid; and
switch the first parameter back to the first value after the identified time duration.

42. The apparatus of claim 41, wherein the instructions are further executable by the processor to cause the apparatus to:
communicate an indication of the time duration, the second value, or both, wherein the second value is determined based at least in part on the transmitted indication.

43. The apparatus of claim 30, wherein the instructions are further executable by the processor to cause the apparatus to:
receive the wake-up signal based at least in part on the monitoring; and
monitor for a scheduling transmission during an active state of the UE based at least in part on the received wake-up signal and the second value of the first parameter.

44. An apparatus for wireless communication at a base station, comprising:
a processor,
memory coupled with the processor; and
instructions stored in the memory and executable by the processor to cause the apparatus to:
identify, for a user equipment (UE), a control resource set configuration that includes a first value of a first parameter and values of one or more additional parameters;
identify a control resource set in which to transmit a wake-up signal to the UE based at least in part on the identified control resource set configuration;
determine a second value of the first parameter based at least in part on the control resource set in which the wake-up signal is to be transmitted being associated with the wake-up signal; and
transmit the wake-up signal in the identified control resource set according to the determined second value of the first parameter and the values of the one or more additional parameters.

45. The apparatus of claim 44, wherein the instructions to determine the second value of the first parameter based at least in part on the control resource set being associated with the wake-up signal are executable by the processor to cause the apparatus to:
identify a second control resource set configuration of the UE that includes at least the second value of the first parameter, wherein the identified control resource set configuration is for control resource sets during an active state of the UE, and the second control resource set configuration is for control resource sets, including the identified control resource set, outside the active state of the UE; and
determine the second value of the first parameter from the second control resource set configuration.

46. The apparatus of claim 44, wherein the instructions to determine the second value of the first parameter are executable by the processor to cause the apparatus to:

modify the first value of the first parameter to be the second value based at least in part on identifying that the identified control resource set is associated with the wake-up signal.

47. The apparatus of claim 44, wherein the first parameter comprises an interleaving pattern, a precoding granularity, a control channel element-to-resource element group mapping, a time duration, a scrambling identification, or a combination thereof, and wherein the one or more additional parameters comprise a time resource, a frequency resource, a transmission configuration indicator state, or a combination thereof.

48. The apparatus of claim 44, wherein the instructions to identify the control resource set in which to transmit the wake-up signal are executable by the processor to cause the apparatus to:
identify a wake-up signal search space set associated with the control resource set.

49. The apparatus of claim 44, wherein the instructions are further executable by the processor to cause the apparatus to:
identify a search space set configuration that indicates the second value of the first parameter; and
determine to use the second value based at least in part on the search space set configuration being associated with the wake-up signal.

50. The apparatus of claim 44, wherein the instructions to identify the control resource set in which to transmit the wake-up signal are executable by the processor to cause the apparatus to:
identify the control resource set is configured outside of a discontinuous reception active time duration based at least in part on a search space set configuration associated with the control resource set.

51. The apparatus of claim 44, wherein the instructions are further executable by the processor to cause the apparatus to:
determine a bandwidth associated with the control resource set is above a threshold, wherein the second value of the first parameter is determined based at least in part on the determination that the bandwidth associated with the control resource set is above the threshold.

52. The apparatus of claim 44, wherein the instructions are further executable by the processor to cause the apparatus to:
determine a bandwidth associated with the control resource set is below a threshold, wherein the second value of the first parameter is determined based at least in part on the determination that the bandwidth associated with the control resource set is below the threshold.

53. The apparatus of claim 44, wherein the instructions are further executable by the processor to cause the apparatus to:
determine a number of UEs in a wake-up group associated with the transmitting of the wake-up signal is above a threshold, wherein the second value of the first parameter is determined based at least in part on the determination that the number of UEs in the wake-up group associated with the transmitting of the wake-up signal is above the threshold.

54. The apparatus of claim 44, wherein the instructions are further executable by the processor to cause the apparatus to:
determine a number of UEs in a wake-up group associated with the transmitting of the wake-up signal is below a threshold, wherein the second value of the first parameter is determined based at least in part on the determination that the number of UEs in the wake-up group associated with the transmitting of the wake-up signal is below the threshold.

55. The apparatus of claim 44, wherein the instructions are further executable by the processor to cause the apparatus to:
identify a time duration for which the determined second value of the first parameter is valid; and
switch the first parameter back to the first value after the identified time duration.

56. The apparatus of claim 55, wherein the instructions are further executable by the processor to cause the apparatus to:
communicate an indication of the time duration, the second value, or both, wherein the second value is determined based at least in part on the transmitted indication.

57. An apparatus for wireless communication at a user equipment (UE), comprising:
means for identifying a control resource set configuration that includes a first value of a first parameter and values of one or more additional parameters;
means for identifying a control resource set to monitor for a wake-up signal based at least in part on the identified control resource set configuration;
means for determining a second value of the first parameter based at least in part on the control resource set being associated with the wake-up signal; and
means for monitoring for the wake-up signal in the identified control resource set according to the determined second value of the first parameter and the values of the one or more additional parameters.

58. An apparatus for wireless communication at a base station, comprising:
means for identifying, for a user equipment (UE), a control resource set configuration that includes a first value of a first parameter and values of one or more additional parameters;
means for identifying a control resource set in which to transmit a wake-up signal to the UE based at least in part on the identified control resource set configuration;
means for determining a second value of the first parameter based at least in part on the control resource set in which the wake-up signal is to be transmitted being associated with the wake-up signal; and
means for transmitting the wake-up signal in the identified control resource set according to the determined second value of the first parameter and the values of the one or more additional parameters.

59. A non-transitory computer-readable medium storing code for wireless communication at a user equipment (UE), the code comprising instructions executable by a processor to:
identify a control resource set configuration that includes a first value of a first parameter and values of one or more additional parameters;
identify a control resource set to monitor for a wake-up signal based at least in part on the identified control resource set configuration;
determine a second value of the first parameter based at least in part on the control resource set being associated with the wake-up signal; and monitor for the wake-up signal in the identified control resource set according to the determined second value of the first parameter and the values of the one or more additional parameters.

60. A non-transitory computer-readable medium storing code for wireless communication at a base station, the code comprising instructions executable by a processor to:

identify, for a user equipment (UE), a control resource set configuration that includes a first value of a first parameter and values of one or more additional parameters;

identify a control resource set in which to transmit a wake-up signal to the UE based at least in part on the identified control resource set configuration;

determine a second value of the first parameter based at least in part on the control resource set in which the wake-up signal is to be transmitted being associated with the wake-up signal; and transmit the wake-up signal in the identified control resource set according to the determined second value of the first parameter and the values of the one or more additional parameters.

\* \* \* \* \*